United States Patent
Holzer et al.

(10) Patent No.: US 12,243,170 B2
(45) Date of Patent: Mar. 4, 2025

(54) LIVE IN-CAMERA OVERLAYS

(71) Applicant: Fyusion, Inc., San Francisco, CA (US)

(72) Inventors: Stefan Johannes Josef Holzer, San Mateo, CA (US); Matteo Munaro, San Francisco, CA (US); Alexander Jay Bruen Trevor, San Francisco, CA (US); Aidas Liaudanskas, San Francisco, CA (US); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 0 days.

(21) Appl. No.: 16/861,100

(22) Filed: Apr. 28, 2020

(65) Prior Publication Data

US 2020/0258309 A1     Aug. 13, 2020

Related U.S. Application Data

(63) Continuation-in-part of application No. 16/518,501, filed on Jul. 22, 2019.

(60) Provisional application No. 62/843,122, filed on May 3, 2019, provisional application No. 62/795,427, filed on Jan. 22, 2019.

(51) Int. Cl.
  G06T 19/00     (2011.01)
  G06T 7/70      (2017.01)

(52) U.S. Cl.
  CPC ............ *G06T 19/006* (2013.01); *G06T 7/70* (2017.01); *G06T 2207/30244* (2013.01)

(58) Field of Classification Search
  CPC ....... G06T 19/006; G06T 7/74; G06T 15/205; G06T 19/003; G06T 2207/10016; G06T 2207/30244; G06T 7/0014; G06T 17/00; G06T 15/20; G06T 7/70; G06T 15/00; G06T 7/75; G06T 13/20; G06T 7/80; G06T 7/73; G06T 7/85; G06T 2207/10028;

(Continued)

(56) References Cited

U.S. PATENT DOCUMENTS 5,764,306 A    6/1998   Steffano
5,923,380 A    7/1999   Yang (Continued)

FOREIGN PATENT DOCUMENTS

CN     107392218     11/2017
CN     107403424     11/2017

(Continued)

OTHER PUBLICATIONS

Alberto Chavez-Aragon, et al., "Vision-Based Detection and Labelling of Multiple Vehicle Parts", 2011 14th International IEEE Conference on Intelligent Transportation Systems Washington, DC, USA. Oct. 5-7, 2011, 6 pages.

(Continued)

*Primary Examiner* — Weiming He
(74) *Attorney, Agent, or Firm* — Kwan & Olynick LLP

(57) ABSTRACT

A live camera feed may be analyzed to determine the identify of an object, and augmented reality overlay data may be determined based on that identity. The overlay data may include one or more tags that are each associated with a respective location on the object. The live camera feed may be presented on a display screen with the tags being positioned as the respective location.

6 Claims, 20 Drawing Sheets
(8 of 20 Drawing Sheet(s) Filed in Color)

(58) Field of Classification Search
CPC ............. G06T 5/50; G06T 2207/20182; G06T 2207/20216
See application file for complete search history.

(56) References Cited

U.S. PATENT DOCUMENTS

| | | | |
|---|---|---|---|
| 6,067,369 A | 5/2000 | Kamei | |
| 6,453,069 B1 | 9/2002 | Matsugu | |
| 6,788,309 B1 | 9/2004 | Swan et al. | |
| 6,879,956 B1 | 4/2005 | Honda | |
| 6,912,313 B2 | 6/2005 | Li | |
| 7,249,019 B2 | 7/2007 | Culy | |
| 7,292,257 B2 | 11/2007 | Kang | |
| 7,565,004 B2 | 7/2009 | Hashimoto | |
| 7,639,741 B1* | 12/2009 | Holt | H04N 19/80 375/240.27 |
| 7,823,066 B1 | 10/2010 | Kuramura | |
| 7,949,529 B2 | 5/2011 | Weider | |
| 9,182,229 B2 | 11/2015 | Grässer | |
| 9,218,698 B2 | 12/2015 | Ricci | |
| 9,467,750 B2 | 10/2016 | Banica et al. | |
| 9,495,764 B1 | 11/2016 | Boardman | |
| 9,886,636 B2 | 2/2018 | Zhang | |
| 9,886,771 B1 | 2/2018 | Chen | |
| 10,223,753 B1 | 3/2019 | Marlow | |
| 10,319,094 B1 | 6/2019 | Chen | |
| 10,373,387 B1 | 8/2019 | Fields | |
| 10,573,012 B1 | 2/2020 | Collins | |
| 10,636,148 B1 | 4/2020 | Chen | |
| 10,657,647 B1* | 5/2020 | Chen | G06T 7/0046 |
| 10,666,934 B1* | 5/2020 | Wang | G06T 7/50 |
| 10,698,558 B2 | 6/2020 | Holzer | |
| 10,713,839 B1 | 7/2020 | Summers | |
| 10,762,385 B1 | 9/2020 | Yang | |
| 10,893,213 B2 | 1/2021 | Magnuszewski | |
| 11,004,188 B2 | 5/2021 | Holzer | |
| 11,212,496 B2 | 12/2021 | Xiu | |
| 11,893,707 B2 | 2/2024 | Holzer | |
| 2002/0063714 A1 | 5/2002 | Haas | |
| 2002/0198713 A1 | 12/2002 | Franz | |
| 2004/0258306 A1 | 12/2004 | Hashimoto | |
| 2006/0187338 A1 | 8/2006 | May | |
| 2007/0253618 A1* | 11/2007 | Kim | G06T 7/80 382/154 |
| 2008/0101656 A1 | 5/2008 | Barnes | |
| 2008/0180436 A1 | 7/2008 | Kraver | |
| 2009/0289957 A1 | 11/2009 | Sroka | |
| 2010/0111370 A1* | 5/2010 | Black | G06K 9/00369 382/111 |
| 2010/0251101 A1 | 9/2010 | Haussecker | |
| 2011/0218825 A1 | 9/2011 | Hertenstein | |
| 2011/0279446 A1 | 11/2011 | Castro | |
| 2011/0286674 A1 | 11/2011 | Campbell | |
| 2013/0039550 A1 | 2/2013 | Blum | |
| 2013/0297353 A1 | 11/2013 | Strange | |
| 2014/0088819 A1 | 3/2014 | Easterly | |
| 2014/0119604 A1 | 5/2014 | Mai | |
| 2014/0172245 A1 | 6/2014 | Soles | |
| 2015/0029304 A1 | 1/2015 | Park | |
| 2015/0097931 A1 | 4/2015 | Hatzilias | |
| 2015/0103170 A1 | 4/2015 | Nelson | |
| 2015/0125049 A1 | 5/2015 | Taigman | |
| 2015/0278987 A1 | 10/2015 | Mihara | |
| 2015/0317527 A1 | 11/2015 | Graumann | |
| 2015/0334309 A1 | 11/2015 | Peng | |
| 2015/0347845 A1 | 12/2015 | Benson | |
| 2015/0365661 A1 | 12/2015 | Hayashi | |
| 2016/0035096 A1 | 2/2016 | Rudow | |
| 2016/0178790 A1 | 6/2016 | Li | |
| 2017/0109930 A1* | 4/2017 | Holzer | G06T 13/20 |
| 2017/0193829 A1 | 7/2017 | Bauer | |
| 2017/0199647 A1 | 7/2017 | Richman | |
| 2017/0208246 A1 | 7/2017 | Kimura et al. | |
| 2017/0277363 A1* | 9/2017 | Holzer | G06F 16/7867 |
| 2017/0293894 A1 | 10/2017 | Taliwal | |
| 2017/0344223 A1 | 11/2017 | Holzer | |
| 2018/0027178 A1 | 1/2018 | Macmillan | |
| 2018/0144547 A1 | 5/2018 | Shakib | |
| 2018/0160102 A1 | 6/2018 | Luo | |
| 2018/0190017 A1 | 7/2018 | Mendez | |
| 2018/0225858 A1 | 8/2018 | Ni | |
| 2018/0255290 A1 | 9/2018 | Holzer | |
| 2018/0260793 A1 | 9/2018 | Li | |
| 2018/0293552 A1 | 10/2018 | Zhang | |
| 2018/0315260 A1 | 11/2018 | Anthony | |
| 2018/0322623 A1 | 11/2018 | Memo | |
| 2018/0338126 A1 | 11/2018 | Trevor | |
| 2018/0349746 A1 | 12/2018 | Vallespi-Gonzalez | |
| 2019/0012394 A1 | 1/2019 | Endras | |
| 2019/0035165 A1 | 1/2019 | Gausebeck | |
| 2019/0066304 A1* | 2/2019 | Hirano | H04N 5/23293 |
| 2019/0073641 A1 | 3/2019 | Utke | |
| 2019/0095877 A1 | 3/2019 | Li | |
| 2019/0096057 A1 | 3/2019 | Allen | |
| 2019/0098277 A1 | 3/2019 | Takama | |
| 2019/0116322 A1 | 4/2019 | Holzer | |
| 2019/0147221 A1 | 5/2019 | Grabner | |
| 2019/0147583 A1 | 5/2019 | Stefan | |
| 2019/0164301 A1 | 5/2019 | Kim | |
| 2019/0189007 A1 | 6/2019 | Herman | |
| 2019/0196698 A1 | 6/2019 | Cohen | |
| 2019/0197196 A1 | 6/2019 | Yang | |
| 2019/0205086 A1 | 7/2019 | McNulty | |
| 2019/0294878 A1 | 9/2019 | Endras | |
| 2019/0317519 A1 | 10/2019 | Chen | |
| 2019/0318759 A1 | 10/2019 | Doshi | |
| 2019/0335156 A1 | 10/2019 | Rusu | |
| 2019/0349571 A1 | 11/2019 | Herman | |
| 2019/0392569 A1 | 12/2019 | Finch | |
| 2020/0111201 A1 | 4/2020 | Kuruvilla | |
| 2020/0118342 A1 | 4/2020 | Varshney | |
| 2020/0151860 A1 | 5/2020 | Safdarnejad | |
| 2020/0193675 A1 | 6/2020 | Burnett, III | |
| 2020/0226206 A1 | 7/2020 | Brake | |
| 2020/0231286 A1 | 7/2020 | Movsesian | |
| 2020/0233892 A1 | 7/2020 | Calhoun | |
| 2020/0234397 A1 | 7/2020 | Holzer | |
| 2020/0234398 A1 | 7/2020 | Holzer | |
| 2020/0234424 A1 | 7/2020 | Holzer | |
| 2020/0234451 A1 | 7/2020 | Holzer | |
| 2020/0234488 A1 | 7/2020 | Holzer | |
| 2020/0236296 A1 | 7/2020 | Holzer | |
| 2020/0236343 A1 | 7/2020 | Holzer | |
| 2020/0257862 A1 | 8/2020 | Kar | |
| 2020/0258309 A1 | 8/2020 | Holzer | |
| 2020/0312028 A1 | 10/2020 | Charvat | |
| 2020/0322546 A1 | 10/2020 | Carolus | |
| 2020/0349757 A1 | 11/2020 | Holzer | |
| 2020/0410278 A1 | 12/2020 | Nelson | |
| 2021/0256616 A1 | 8/2021 | Hayward | |
| 2022/0335681 A1 | 10/2022 | Horikawa | |

FOREIGN PATENT DOCUMENTS

| | | | |
|---|---|---|---|
| CN | 109242835 | 1/2019 | |
| GB | 2573170 A | * 10/2019 | ............. G06T 15/04 |
| WO | 2016064921 A1 | 4/2016 | |
| WO | 2017115149 A1 | 7/2017 | |
| WO | 2017195228 A1 | 11/2017 | |
| WO | 2019186545 | 10/2019 | |
| WO | 2019229912 | 12/2019 | |
| WO | 2020009948 A1 | 1/2020 | |
| WO | 2020125726 | 6/2020 | |
| WO | 2020125726 A1 | 6/2020 | |
| WO | 2020154096 A1 | 7/2020 | |
| WO | 2020214006 A1 | 10/2020 | |

OTHER PUBLICATIONS

U.S. Appl. No. 16/518,501, CTFR—Final Rejection, Dec. 9, 2020, 16 pgs.
U.S. Appl. No. 16/518,501, Examiner Interview Summary Record (Ptol—413), Nov. 23, 2020, 2 pgs.

(56) References Cited

OTHER PUBLICATIONS

U.S. Appl. No. 16/518,501, Non-Final Rejection, Sep. 1, 2020, 15 pgs.
U.S. Appl. No. 16/518,512, Examiner Interview Summary Record (Ptol—413), Nov. 19, 2020, 3 pgs.
U.S. Appl. No. 16/518,512, Non-Final Rejection, Oct. 1, 2020, 24 pgs.
U.S. Appl. No. 16/518,512, Office Action Appendix, Nov. 19, 2020, 1 pg.
U.S. Appl. No. 16/518,558, Non-Final Rejection, Sep. 8, 2020, 14 pgs.
U.S. Appl. No. 16/518,585, Non-Final Rejection, Sep. 3, 2020, 13 pgs.
U.S. Appl. No. 16/596,516, Non-Final Rejection, Jun. 23, 2020, 37 pgs.
U.S. Appl. No. 16/596,516, Notice Of Allowance And Fees Due (Ptol-85), Sep. 21, 2020, 10 pgs.
U.S. Appl. No. 16/692,133, Non-Final Rejection, Jul. 24, 2020, 17 pgs.
U.S. Appl. No. 16/692,170, Non-Final Rejection, Nov. 20, 2020, 13 pgs.
U.S. Appl. No. 16/692,219, Non-Final Rejection, Dec. 8, 2020, 9 pgs.
U.S. Appl. No. 16/861,100, Non-Final Rejection, Oct. 8, 2020, 11 pgs.
U.S. Appl. No. 16/518,512, Notice of Allowance mailed Jan. 25, 2021, 7 pgs.
U.S. Appl. No. 16/518,512, Notice of Allowance mailed Dec. 16, 2020, 9 pgs.
U.S. Appl. No. 16/518,558, Examiner Interview Summary mailed Dec. 16, 2020, 1 pg.
U.S. Appl. No. 16/518,558, Final Office Action mailed Dec. 16, 2020, 16 pgs.
U.S. Appl. No. 16/518,570, Non-Final Office Action mailed Jan. 6, 2021, 17 pgs.
U.S. Appl. No. 16/518,585, Notice of Allowance mailed Dec. 14, 2020, 5 pgs.
U.S. Appl. No. 16/692,133, Notice of Allowance mailed Dec. 15, 2020, 7pgs.
U.S. Appl. No. 16/692,170, Notice of Allowance mailed Feb. 9, 2021, 8 pgs.
U.S. Appl. No. 16/861,100, Advisory Action mailed Jun. 10, 2021, 3 pgs.
U.S. Appl. No. 16/861,100, Examiner Interview Summary mailed Feb. 10, 2021, 2 pgs.
U.S. Appl. No. 16/861,100, Examiner Interview Summary mailed Jun. 10, 2021, 1 pg.
U.S. Appl. No. 16/861,100, Examiner Interview Summary mailed Jun. 3, 2021, 2 pgs.
U.S. Appl. No. 16/861,100, Final Office Action mailed Feb. 26, 2021, 15 pgs.
Gerd Lindner et al., "Structure-Preserving Sparsification of Social Networks", arXiv:1505.00564v1 [cs.SI] May 4, 2015, 8 pages.
Int'l Application Serial No. PCT/US20/12592, Int'l Search Report and Written Opinion dated Apr. 21, 2020. 9 pages.
International Search Report and Written Opinion for App. No. PCT/US2021/013431, dated May 6, 2021, 10 pages.
International Search Report and Written Opinion for App. No. PCT/US2021/013471, dated May 6, 2021, 10 pages.
International Search Report and Written Opinion for App. No. PCT/US2021/013472, dated May 11, 2021, 10 pages.
Jeff Donahue et al., "DeCAF: ADeep Convolutional Activation Feature for Generic Visual Recognition", arXiv: 1310.153lvl [cs.CV] Oct. 6, 2013, 10 pages.
Office Action (Final Rejection) dated Jan. 19, 2022 for U.S. Appl. No. 16/861,097 (pp. 1-16).
Office Action (Final Rejection) dated Jan. 20, 2022 for U.S. Appl. No. 17/215,596 (pp. 1-16).
Office Action (Final Rejection) dated Mar. 3, 2022 for U.S. Appl. No. 17/174,250 (pp. 1-24).
Office Action (Final Rejection) dated Apr. 19, 2022 for U.S. Appl. No. 16/692,219 (pp. 1-13).
Office Action (Final Rejection) dated Nov. 9, 2021 for U.S. Appl. No. 16/518,558 (pp. 1-17).
Office Action (Final Rejection) dated Dec. 7, 2021 for U.S. Appl. No. 16/518,501 (pp. 1-21).
Office Action (Final Rejection) dated Jun. 14, 2021 for U.S. Appl. No. 16/518,570 (pp. 1-23).
Office Action (Non-Final Rejection) dated Mar. 28, 2022 for U.S. Appl. No. 16/518,501 (pp. 1-21).
Office Action (Non-Final Rejection) dated Mar. 29, 2022 for U.S. Appl. No. 16/518,558 (pp. 1-16).
Office Action (Non-Final Rejection) dated Apr. 14, 2022 for U.S. Appl. No. 17/144,879 (pp. 1-12).
Office Action (Non-Final Rejection) dated Sep. 2, 2021 for U.S. Appl. No. 17/174,250 (pp. 1-22).
Office Action (Non-Final Rejection) dated Sep. 24, 2021 for U.S. Appl. No. 17/215,596 (pp. 1-14).
Office Action (Non-Final Rejection) dated Oct. 4, 2021 for U.S. Appl. No. 16/861,097 (pp. 1-15).
Office Action (Non-Final Rejection) dated Dec. 7, 2021 for U.S. Appl. No. 16/692,219 (pp. 1-12).
Office Action (Notice of Allowance and Fees Due (PTOL-85)) dated Apr. 7, 2022 for U.S. Appl. No. 17/215,596 (pp. 1-9).
Office Action (Notice of Allowance and Fees Due (PTOL-85)) dated Sep. 15, 2021 for U.S. Appl. No. 16/518,570 (pp. 1-8).
Office Action dated Jul. 16, 2021 for U.S. Appl. No. 16/518,501 (pp. 1-23).
Office Action dated Jul. 26, 2021 for U.S. Appl. No. 16/518,558 (pp. 1-17).
Office Action dated Jun. 14, 2021 for U.S. Appl. No. 16/518,570 (pp. 1-24).
Office Action dated May 18, 2021 for U.S. Appl. No. 16/692,219 (pp. 1-13).
Riza Alp Guler et al., "DensePose: Dense Human Pose Estimation In The Wild", arXiv:1802.00434v1 [cs.CV] Feb. 1, 2018, 12 pages.
Shubham Tulsiani and Jitendra Malik, "Viewpoints and Keypoints", arXiv:1411.6067v2 [cs.CV] Apr. 26, 2015, 10 pages.
Wenhao Lu, et al., "Parsing Semantic Parts of Cars Using Graphical Models and Segment Appearance Consistency", arXiv:1406.2375v2 [cs.CV] Jun. 11, 2014, 12 pages.
Office Action (Non-Final Rejection) dated Jun. 15, 2022 for U.S. Appl. No. 16/861,097 (pp. 1-17).
Office Action (Non-Final Rejection) dated Jul. 22, 2022 for U.S. Appl. No. 17/351,124 (pp. 1-12).
Office Action dated Jun. 15, 2022 for U.S. Appl. No. 17/190,268 (pp. 1-17).
Giegerich, et al., "Automated Classification of "Bad Images" by Means of Machine Learning for Improvied Analysis of Vehicle Undercarriages," TechConnect Briefs 2022, pp. 1-4.
Green, et al., "Vehicle Undercarriage Scanning for use in Crash Reconstruction," FARO White Paper, 2015, 5 pages.
IVUS Intelligent Vehicle Undercarriage Scanner Brochusre, GatekeeperSecurity.com, 2 pages.
Kiong, Frederick Chong Chuen, "Vehicle Undercarriage Scanning System," A disseration for ENG 4111 and ENG 4112 Research Project, University of Southern Queensland (USQ), Oct. 27, 2005, 163 pages.
Office Action (Final Rejection) dated Aug. 31, 2022 for U.S. Appl. No. 17/144,879 (pp. 1-14).
Office Action (Non-Final Rejection) dated Sep. 16, 2022 for U.S. Appl. No. 16/937,884.
Office Action (Notice of Allowance and Fees Due (PTOL-85)) dated Sep. 19, 2022 for U.S. Appl. No. 17/144,885 (pp. 1-7).
Extended European Search Report issued in App. No. EP20744281.5, dated Aug. 12, 2022, 7 pages.
Office Action (Final Rejection) dated Aug. 12, 2022 for U.S. Appl. No. 16/518,501 (pp. 1-21).
Office Action (Final Rejection) dated Aug. 12, 2022 for U.S. Appl. No. 16/518,558 (pp. 1-18).
Office Action (Non-Final Rejection) dated Aug. 18, 2022 for U.S. Appl. No. 17/174,250 (pp. 1-17).

(56) References Cited

OTHER PUBLICATIONS

Office Action (Notice of Allowance and Fees Due (PTOL-85)) dated Aug. 17, 2022 for U.S. Appl. No. 16/692,219 (pp. 1-7).
Dorfler Martin et al, "Application of Surface Reconstruction for Car Undercarriage Inspection", 2020 3rd International Conference on Intelligent Robotic and Control Engineering (IRCE), IEEE, (Aug. 10, 2020), doi: 10.1109/IRCE50905.2020.9199251, pp. 47-51, XP033828019 Abstract Only.
Office Action (Final Rejection) dated Jan. 31, 2023 for U.S. Appl. No. 17/351,124 (pp. 1-14).
Office Action (Final Rejection) dated Nov. 14, 2022 for U.S. Appl. No. 16/861,097 (pp. 1-19).
Office Action (Non-Final Rejection) dated Jan. 6, 2023 for U.S. Appl. No. 17/144,879 (pp. 1-14).
Office Action (Non-Final Rejection) dated Jan. 13, 2023 for U.S. Appl. No. 16/518,501 (pp. 1-21).
Office Action (Non-Final Rejection) dated Jan. 18, 2023 for U.S. Appl. No. 16/518,558 (pp. 1-16).
Office Action (Non-Final Rejection) dated Mar. 16, 2023 for U.S. Appl. No. 16/937,884 (pp. 1-30).
Office Action (Non-Final Rejection) dated Dec. 22, 2022 for U.S. Appl. No. 17/502,579 (pp. 1-20).
Office Action (Notice of Allowance and Fees Due (PTOL-85)) dated Feb. 13, 2023 for U.S. Appl. No. 17/190,268 (pp. 1-4).
Office Action (Notice of Allowance and Fees Due (PTOL-85)) dated Apr. 4, 2023 for U.S. Appl. No. 17/174,250 (pp. 1-8).
Office Action (Notice of Allowance and Fees Due (PTOL-85) dated Nov. 15, 2022 for U.S. Appl. No. 17/190,268 (pp. 1-7).
Office Action (Notice of Allowance and Fees Due (PTOL-85)) dated Dec. 19, 2022 for U.S. Appl. No. 17/190,268 (pp. 1-4).
Robert Ross et al, "Mobile robot mosaic imaging of vehicle undercarriages using catadioptric vision", Control, Automation and Information Sciences (ICCAIS), 2012 International Conference on, IEEE, (Nov. 26, 2012), doi: 10.1109/ICCAIS.2012.6466596, ISBN 978-1-4673-0812-0, pp. 247-252, XP032335072 Abstract Only.
S. R. Sukumar et al, "Under Vehicle Inspection with 3d Imaging", 3D Imaging for Safety and Security, Dordrecht, Springer Netherlands, (Jan. 1, 2007), vol. 35, pp. 249-278, doi:10.1007/978-1-4020-6182-0_11, ISBN 978-1-4020-6181-3, XP055518511.
Zhou, X. Q., H. K. Huang, and Shieh-Liang Lou. "Authenticity and integrity of digital mammography images." IEEE transactions on medical imaging 20.8 (2001): 784-791. (Year: 2001).
Office Action (Notice of Allowance and Fees Due (PTOL-85)) dated May 1, 2023 for U.S. Appl. No. 17/502,579 (pp. 1-8).
Office Action (Final Rejection) dated Jun. 7, 2023 for U.S. Appl. No. 16/518,501 (pp. 1-19).
Office Action (Notice of Allowance and Fees Due (PTOL-85)) dated Jun. 5, 2023 for U.S. Appl. No. 16/518,558 (pp. 1-8).
Office Action (Non-Final Rejection) dated Jun. 5, 2023 for U.S. Appl. No. 16/861,097 (pp. 1-20).
Office Action (Notice of Allowance and Fees Due (PTOL-85)) dated Jun. 7, 2023 for U.S. Appl. No. 17/144,831 (pp. 1-8).
Office Action (Non-Final Rejection) dated Jun. 22, 2023 for U.S. Appl. No. 17/351,124 (pp. 1-15).
Office Action (Final Rejection) dated Jul. 6, 2023 for U.S. Appl. No. 18/163,868 (pp. 1-19).
Zhao, Jian. "Applying digital watermarking techniques to online multimedia commerce." Proc. Int. Conf. on Imaging Science, Systems and Applications (CISSA'97). vol. 7. 1997. (Year: 1997) 7 pages.
Office Action (Final Rejection) dated Jul. 21, 2023 for U.S. Appl. No. 16/937,884 (pp. 1-32).
International Preliminary Report on Patentability issued in App. No. PCT/US2022/070332, mailing date Sep. 14, 2023, 11 pages.
Office Action (Final Rejection) dated Sep. 20, 2023 for U.S. Appl. No. 16/861,097 (pp. 1-18).
Office Action (Final Rejection) dated Sep. 26, 2023 for U.S. Appl. No. 17/144,879 (pp. 1-15).
Notice of Allowance dated Oct. 11, 2023 for U.S. Appl. No. 18/068,454 (pp. 1-6).
Office Action (Non-Final Rejection) dated Oct. 11, 2023 for U.S. Appl. No. 18/068,454 (pp. 1-5).
Office Action (Notice of Allowance and Fees Due (PTOL-85)) dated Oct. 17, 2023 for U.S. Appl. No. 18/163,868 (pp. 1-7).
Office Action (Notice of Allowance and Fees Due (PTOL-85)) dated Dec. 7, 2023 for U.S. Appl. No. 18/163,868 (pp. 1-4).
Office Action (Final Rejection) dated Jan. 30, 2024 for U.S. Appl. No. 17/351,124 (pp. 1-21).
Office Action (Notice of Allowance and Fees Due (PTOL-85)) dated Feb. 2, 2024 for U.S. Appl. No. 18/338,240 (pp. 1-8).
Office Action (Notice of Allowance and Fees Due (PTOL-85)) dated Feb. 1, 2024 for U.S. Appl. No. 18/068,454 (pp. 1-7).
Office Action (Non-Final Rejection) dated Feb. 12, 2024 for U.S. Appl. No. 16/518,501 (pp. 1-16).
Office Action (Non-Final Rejection) dated Feb. 9, 2024 for U.S. Appl. No. 18/353,416 (pp. 1-23).
Office Action (Non-Final Rejection) dated Mar. 4, 2024 for U.S. Appl. No. 16/861,097 (pp. 1-19).
Office Action dated Mar. 19, 2024 for U.S. Appl. No. 17/144,879 (pp. 1-19).
Office Action (Non-Final Rejection) dated Mar. 19, 2024 for U.S. Appl. No. 17/144,879 (pp. 1-18).
Office Action (Notice of Allowance and Fees Due (PTOL-85)) dated Apr. 25, 2024 for U.S. Appl. No. 18/457,166 (pp. 1-8).
Office Action (Non-Final Rejection) dated May 9, 2024 for U.S. Appl. No. 17/351,124 (pp. 1-15).
Office Action (Final Rejection) dated Jul. 2, 2024 for U.S. Appl. No. 16/518,501 (pp. 1-16).
Office Action (Notice of Allowance and Fees Due (PTOL-85)) dated Jun. 28, 2024 for U.S. Appl. No. 18/353,416 (pp. 1-8).
Office Action (Final Rejection) dated Jul. 25, 2024 for U.S. Appl. No. 16/861,097 (pp. 1-21).
Abd-Eldayem, Mohamed M. "A proposed security technique based on watermarking and encryption for digital imaging and communications in medicine." Egyptian Informatics Journal 14.1 (2013): 1-13. (Year: 2013).
Aparna, Puvvadi, and Polurie Venkata Vijay Kishore. "A blind medical image watermarking for secure e-healthcare application using crypto-watermarking system." Journal of Intelligent Systems 29.1 (2019): 1558-1575. (Year: 2019).
Office Action (Non-Final Rejection) dated Aug. 1, 2024 for U.S. Appl. No. 16/937,884 (pp. 1-34).
Office Action (Notice of Allowance and Fees Due (PTOL-85)) dated Aug. 27, 2024 for U.S. Appl. No. 18/353,416 (pp. 1-2).
Office Action (Notice of Allowance and Fees Due (PTOL-85)) dated Aug. 28, 2024 for U.S. Appl. No. 18/531,614 (pp. 1-7).
Office Action (Notice of Allowance and Fees Due (PTOL-85)) dated Sep. 16, 2024 for U.S. Appl. No. 17/351,124 (pp. 1-7).
Chinese Patent Application No. 202080017453.9, Office Action issued Jul. 6, 2024, 17 pages.
Office Action (Notice of Allowance and Fees Due (PTOL-85)) dated Nov. 6, 2024 for U.S. Appl. No. 16/861,097 (pp. 1-8).
Office Action (Non-Final Rejection) dated Nov. 19, 2024 for U.S. Appl. No. 18/240,773 (pp. 1-22).
Office Action (Non-Final Rejection) dated Nov. 21, 2024 for U.S. Appl. No. 18/633,446 (pp. 1-32).

* cited by examiner

LIVE IN-CAMERA OVERLAYS

CROSS-REFERENCE TO RELATED APPLICATIONS

The present application claims priority under 35 U.S.C. 120 to U.S. Provisional Patent Application No. 62/843,122, titled "LIVE IN-CAMERA OVERLAYS", filed May 3, 2019, by Holzer et al., which is hereby incorporated by reference in its entirety and for all purposes. The present application is also a continuation-in-part of and claims priority to U.S. patent application Ser. No. 16/518,501, titled "AUTOMATIC VIEW MAPPING FOR SINGLE- AND MULTI-VIEW CAPTURES", filed Jul. 22, 2019, by Holzer et al., which claims priority under 35 U.S.C. 120 to U.S. Provisional Patent Application No. 62,795,427, titled "AUTOMATIC VIEW MAPPING FOR SINGLE- AND MULTI-VIEW CAPTURES", filed Jan. 22, 2019, by Holzer et al., both of which are hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

The present disclosure relates generally to the processing of visual digital media content, and more specifically to live in-camera overlays of visual data.

DESCRIPTION OF RELATED ART

Visual digital media content is commonly used to analyze objects. However, images may be captured from various viewpoints, whereas performing consistent analysis across different objects and different views of the same object often involves standardized object views. For example, video or images of a vehicle may be captured from different viewpoints, while damage to the vehicle may be annotated in a top-down or other standard view of the vehicle. Nevertheless, current techniques for mapping between images captured at different viewpoints of an object are ineffective. Accordingly, improved techniques for mapping between images captured at different viewpoints of an object are desired.

OVERVIEW

According to various embodiments, techniques and mechanisms described herein provide for systems, devices, methods, and machine-readable media for processing visual data. In some implementations, an object identity may be determined for an object represented in a live camera feed captured at a camera at the computing device. Augmented reality overlay data may be determined based on the object identity. The augmented reality overlay data may include one or more tags characterizing features of the object. Each tag may be associated with a respective location on the object, and each location may be represented in a reference view of the object. For each of a plurality of frames in the live camera feed, a respective frame location may be determined for one or more of the tags. Each of the respective frame locations may be determined based on a correspondence between the reference view of the object and the respective frame. The live camera feed may be presented on a display screen and may include the plurality of frames, each of which may include a respective one of the tag. Each tag may be positioned at the respective frame location.

According to various embodiments, for each of the frames, the correspondence between the reference view of the object and the respective frame may be determined. Alternately, or additionally, the live camera feed may be divided into an initialization phase and a presentation phase, the initialization phase preceding the presentation phase. The initialization phase involves projecting one or more triangulated points into a designated frame. The projection may be performed based on camera pose information determined based on data collected from an inertial measurement unit at the computing device. The presentation phase may involve triangulating a three-dimensional representation of the object for each of the frames. The three-dimensional representation may be triangulated based on the correspondence between the reference view and the respective frame. The reference view of the object may be a multi-view interactive digital media representation, which may include a plurality of images of the object captured from different perspective views. The multi-view interactive digital media representation may be navigable in one or more dimensions.

In some embodiments, a three-dimensional model of the object may be determined based on the multi-view interactive digital media representation. The object may be a vehicle. The reference view of the object may include each of a left vehicle door, a right vehicle door, and a windshield.

These and other embodiments are described further below with reference to the figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The included drawings are for illustrative purposes and serve only to provide examples of possible structures and operations for the disclosed inventive systems, apparatus, methods and computer program products for image view mapping. These drawings in no way limit any changes in form and detail that may be made by one skilled in the art without departing from the spirit and scope of the disclosed implementations.

DETAILED DESCRIPTION

Figure 1:
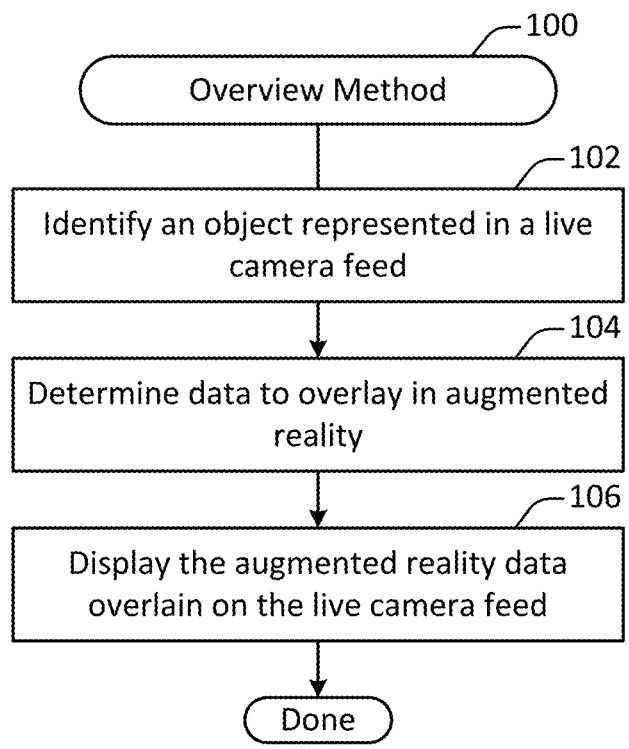
FIG. 1 illustrates one example of a live overlay overview method, performed in accordance with one or more embodiments.

According to various embodiments, techniques and mechanisms described herein provide for an augmented-reality (AR) view that overlays information on top of an object. For example, the AR view may be presented in the camera view of a mobile device. As another example, the AR view may be presented in a head-mounted display. The AR information may be presented as one or more tags that each include text, a link to a website, video data, audio data, image data, or other such information.

According to various embodiments, techniques and mechanisms described herein facilitate the mapping of images between different viewpoints. Mapping of images between different viewpoints may involve the identification of a correspondence relationship between points or pixels that exist in one image and points or pixels that exist in another image. For example, a mapping between images representing different perspective views of the same object may be determined. Such perspective views may be captured from different viewpoints in relation to the object. As another example, a mapping between an image representing a perspective view of the object may be mapped to an image representing a top-down view of the object.

In some implementations, mapping of images between different viewpoints may be used in a variety of applications. For example, mapping between different image views can facilitate the translation of image tags from one viewpoint to another. The information for a tag can be provided by a user that captures the visual data. For example, the system can prompt the user to capture visual information for that specific tag location. Alternately, or additionally, information can be gathered automatically from a database. For example, in the case of a vehicle, if the vehicle identification number (VIN) of a vehicle is available then the system could use that to either access a public VIN database or any other specific database that contains additional information about the object.

According to various embodiments, techniques and mechanisms described herein may be used to identify and represent damage to an object such as a vehicle. The damage detection techniques may be employed by untrained individuals. For example, an individual may collect one or more perspective images of an object, and the system may detect the damage automatically. Damage may be represented by mapping from one or more perspective images to a top-down view and/or one or more standard perspective views.

Conventional approaches to viewpoint mapping and object component identification from images do not provide an accurate and dense mapping between a perspective frame and a top-down view or between different perspective frame views. Conventional approaches to image mapping in either direction involve time-intensive, manual processes that result in significant time and cost. Moreover, human repeatability is frequently too low for correct comparisons of top-down mappings generated over multiple runs. Conventional approaches for performing a dense mapping between perspective images of an object and a 2D parametrization of the object are resource-intensive and do not address the mapping from parametric to perspective.

According to various embodiments, techniques and mechanisms described herein facilitate the automatic mapping to and from top-down views or between perspective views. Using these techniques and mechanisms, mapping may be consistent over multiple points of view and/or multiple captures.

In some implementations, techniques and mechanisms described herein facilitate rapid mapping procedures that use resources efficiently. For example, mapping may be performed in real-time or near-real time on a mobile device such as a smart phone that includes relatively limited computing resources.

In some embodiments, data available from different images may be combined, such as by averaging the data. For example, damage may be detected in a set of different images. Then, the images may be combined, such as by averaging, in a top-down view so that the results are made more robust.

In some embodiments, techniques and mechanisms described herein may facilitate efficient object tagging. Depending on which is easier, a user may place tags in either a top-down view or a perspective view and have those tags propagated to the other view. The perspective view may be a single image or may be a multi-view capture.

In some implementations, techniques and mechanisms described herein facilitate the automatic mapping to and from multi-view representations. Additional details regarding multi-view representation construction and other features are discussed in co-pending and commonly assigned U.S. patent application Ser. No. 15/934,624, "Conversion of an Interactive Multi-view Image Data Set into a Video", by Holzer et al., filed Mar. 23, 2018, which is hereby incorporated by reference in its entirety and for all purposes.

A top-down or schematic view of an object is a 360-degree view of all its parts projected to a flat surface. It is useful for visualizing all the object surfaces in a single image. Several uses of a top-down view of an object pertain to vehicles. For example, in the case of a vehicle, a schematic top-down view of a vehicle is used in car rental forms. A user may walk around the vehicle to inspect it from multiple angles. The user may then manually annotate on the top-down image the location of the damages present on the rented vehicle. The top-down view is thus useful for aggregating information from multiple views into a format that is easy to compare over multiple inspections.

As another example, a schematic top-down view of a vehicle can be used for visual tagging where the user clicks on the top-down-view to set a tag and the same tag then appears on the captured visual images of the vehicle or vice versa. In this way, the schematic top-down view can also be used to position a tag in one view of the vehicle, project it into the top-down view, and then project it back to all other captured views of the car where it would be visible. Such an approach allows for robust tagging of a 360-degree object visualization, for example of a vehicle.

As yet another example, a schematic top-down view of a vehicle may be used for visual tagging with persistent tag locations across different object visualizations. For example, in the case of a vehicle, a user such as a vehicle dealership agent may wish to always locate tags at certain locations on a vehicle, such as at one of the wheels or the engine. In this case, the user can specify these general tags in a top-down view and then every capture will automatically receive a tag at that location. Alternately, user can specify these general tags in a 360-degree reference view, which may then be mapped back into a top-down view.

As yet another example, a schematic top-down view of a vehicle may be used to structure a set of visual captures such as images, videos, and multi-view captures, in a way that makes it easier and more efficient for a user (e.g. a person that processes insurance claims) to understand and process the given visual data.

FIG. 1 illustrates one example of a live overlay method 100, performed in accordance with one or more embodiments. The method 100 may be performed on any suitable computing device. For example, the method 100 may be performed on a mobile computing device such as a smart phone, head-mounted display, or smart glasses. In some configurations, one or more devices may operate in coordination. For instance, a smart glasses or head-mounted display may operate in communication with a smart phone or other device to provide an augmented reality overlay of a live camera feed.

An object represented in a live camera feed is identified at 102. According to various embodiments, the object represented in a live camera feed may be identified in any of a variety of ways, which may include, but are not limited to, those delineated in the following examples.

In some embodiments, a barcode associated with the object may be scanned, for instance via the live camera feed. The barcode may be a one-dimensional barcode, a two-dimensional barcode, or any other suitable code that may be read by a camera.

In some implementations, input that includes an identifier or other indication of the object may be received. Such input may be received, for instance, by scanning an image of the identifier or receiving user input from a user input device.

In some embodiments, the object may be associated with an entity such as an owner or renter. The object entity may be, for instance, a company such as a car dealership, an individual, or any other suitable entity. The association may be determined, for example, by linking an app on a mobile phone with an account associated with the object entity.

In some implementations, a visual search may be performed using visual information drawn from the live camera feed. For instance, image data of the object may be combined with other information such as location data to search a database of possible objects. In the example of a vehicle dealership, the location of the live camera feed may be used to identify a database of vehicles associated with the vehicle dealership, while image data from the live camera feed may be used to search the identified database.

In some embodiments, object recognition may be performed on visual data collected from the live camera feed. The object recognition may be used to categorize the object as, for example, a person or a vehicle. Object recognition information may then be used to formulate or refine a query to retrieve information about the object.

Data to overlay in augmented reality is determined at 104. According to various embodiments, the data to overlay may be determined by querying a database based on the identity of the object determined as described with respect to the operation 102. In some configurations, overlay data may be defined on a per-object bases. Alternately, or additionally, overlay data may be defined for a class of objects. For example, in the context of vehicles, some data may be defined for all vehicles that meet one or more criteria, such as late-model sedans. However, other data may be defined for specific vehicles, such as information about trim levels or damage to used vehicles.

In some implementations, the data to overlay in augmented reality may include a reference image. A reference image may include one or more standardized images, three-dimensional models, two-dimensional models, top-down views, or other reference information corresponding to an object included in the live camera feed. The reference image may be used to position overlay information. For example, overlay information may be positioned at a specific location or locations on a reference image. The reference image may then be mapped to the object included in the live camera feed to determine a location in the live camera feed at which to present the overlay information.

According to various embodiments, any suitable information may be included in a tag for overlaying on a live camera feed. Such information may include, but is not limited to: text data, a link to a website, video data, audio data, and image data. Such information may be entered manually in some cases, for example when different objects have different characteristics. Alternately, or additionally, such information may be retrieved from a database, for instance when the same information is to be shown overlain on different objects, such as different objects of the same object type. In particular embodiments, automatically populated tags may be hidden if they do not apply to a specific object, such as a vehicle that lacks a specific feature.

According to various embodiments, a location for a tag may be determined in any of various ways. For example, a multi-view interactive digital media representation (MVIDMR) of the object may be captured, and a user may position a tag at a selected location within the MVIDMR. As another example, a top-down or other standardized view of the object may be provided, and tag locations may be specified on the top-down view. As still another example, one or more tag locations may be defined on a 3D model of the object. As yet another example, one or more tag locations may be defined by first capturing images of the locations on the object, and then processing those images to estimate the locations with respect to the object. For instance, the center of an image may be used to mark the location for the tag on the object.

In some embodiments, the location of object information may be defined based on user input. For example, a user such as an administrator may create a tag and specify a location in an object model where the tag is to be located.

In some embodiments, the location of object information may be defined automatically. For example, for a tag that relates to a characteristic of a vehicle wheel, the tag may be automatically located on a wheel portion of the object model.

The augmented reality data is overlain on the live camera feed at 106. In some implementations, overlaying the augmented reality data on the live camera feed may involve displaying the augmented reality data on a mobile phone display, head-mounted display, or other suitable device. When the augmented reality data is overlain, tag locations identified at 104 may be mapped to corresponding locations in the live images presented in the live camera feed.

According to various embodiments, one or more of a variety of techniques may be used to overlay the augmented reality data on the live camera feed. Examples of such techniques are discussed throughout the application as filed, and more specifically with respect to the methods 200, 300, and 400 shown in FIGS. 2, 3, and 4.

Figure 20:
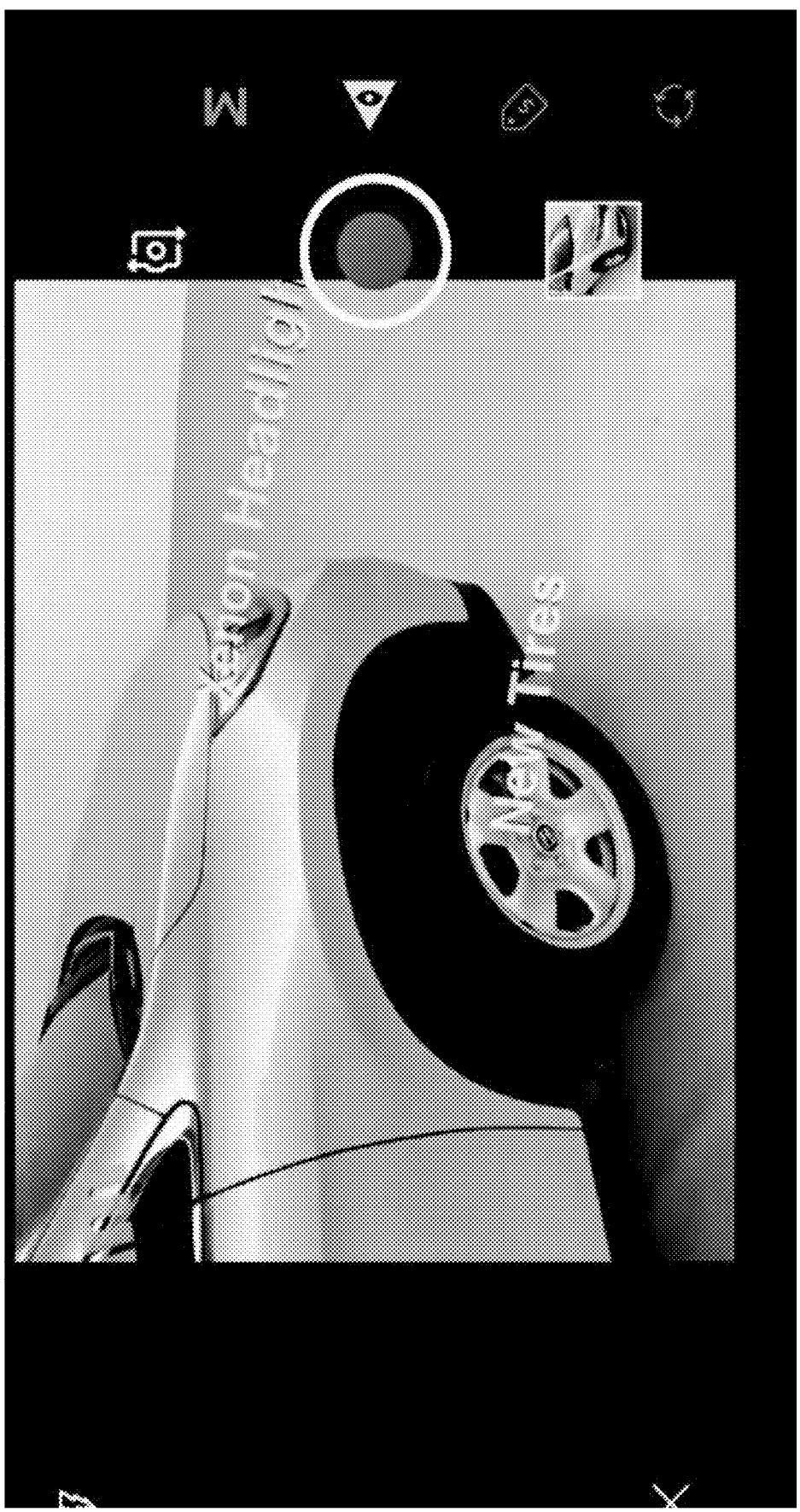
FIG. 20 illustrates a frame from a live camera view processed in accordance with one or more embodiments.

FIG. 20 illustrates a frame from a live camera view processed in accordance with one or more embodiments. The frame shown in FIG. 20 is presented in a user interface on a mobile phone. In FIG. 20, the tag "New Tires" is overlain on top of the tire, while the tag "Xenon Headlight" is overlain on top of the headlight. The locations of the tags are updated as the camera pans around the vehicle. As the locations for the tags move out of the view, the tags may be omitted. As the locations for different tags move into the view, the different tags may be displayed.

Figure 2:
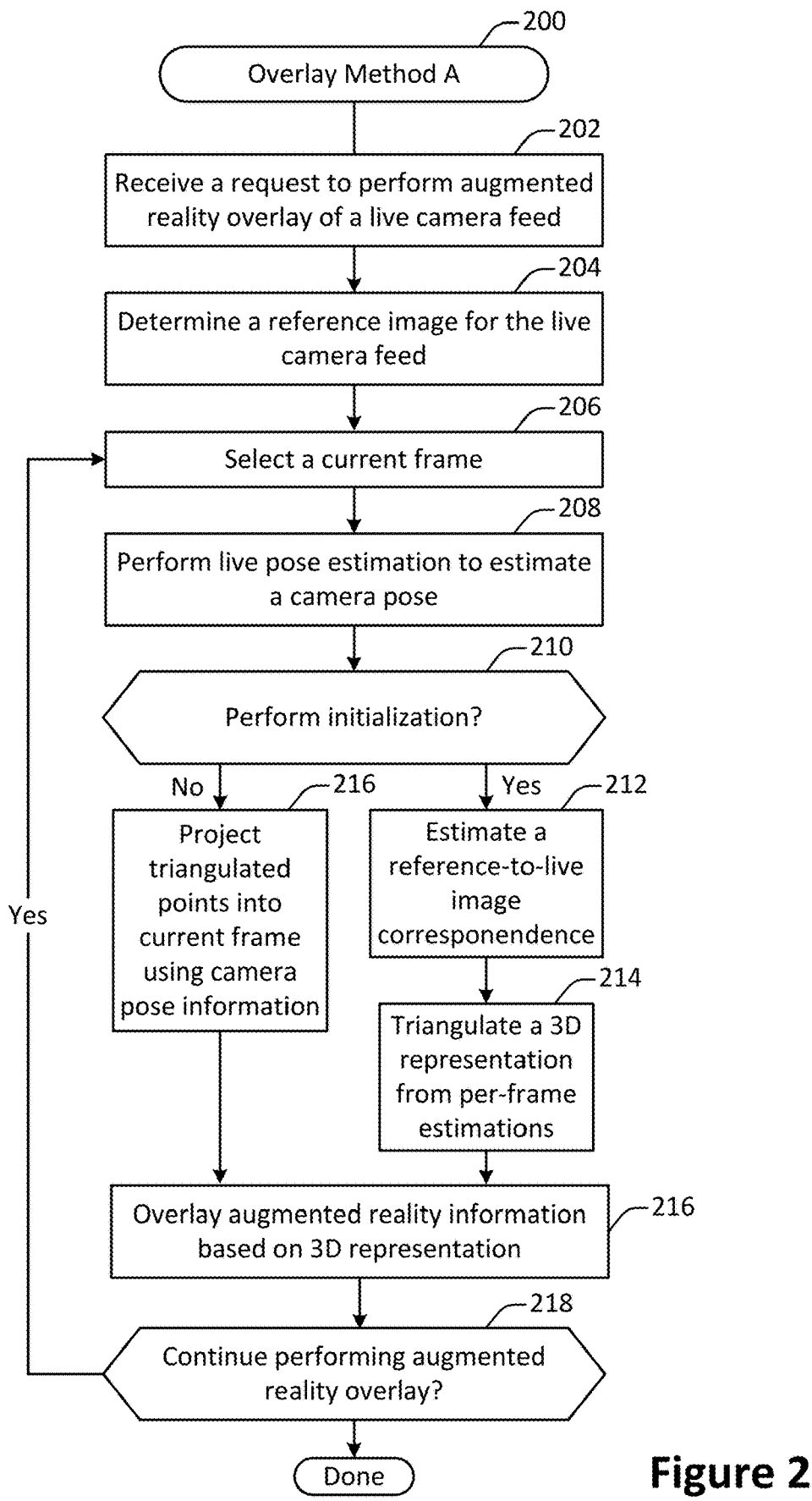
FIG. 2 illustrates one example of a method A for performing a live overlay, performed in accordance with one or more embodiments.

FIG. 2 illustrates one example of a method A 200 for performing a live overlay, performed in accordance with one or more embodiments. The method 200 may be performed on any suitable computing device. For example, the method 200 may be performed on a mobile computing device such as a smart phone, head-mounted display, or smart glasses. In some configurations, one or more devices may operate in coordination. For instance, a smart glasses or head-mounted display may operate in communication with a smart phone or other device to provide an augmented reality overlay of a live camera feed.

A request to perform augmented reality overlay of a live camera feed is received at 202. According to various embodiments, the request may be received as part of the operation of the method 100 shown in FIG. 1. For instance, the request may be received at operation 106.

A reference image is determined for the live camera feed at 204. In some implementations, the reference image may include one or more standardized images, three-dimensional models, two-dimensional models, or other reference information corresponding to an object included in the live camera feed. The reference image may be used to position overlay information. For example, overlay information may be positioned at a specific location or locations on a reference image. The reference image may then be mapped to the object included in the live camera feed to determine a location in the live camera feed at which to present the overlay information. In some implementations, the reference image may be determined as part of the determination of information to overlay in augmented reality at operation 104.

A current frame is selected at 206. According to various embodiments, each or selected frames in a succession of live frames captured by a camera may be processed. In this way, augmented reality information may be overlain on the camera when the frame is presented on a display screen.

Live pose estimation is performed at 208 to estimate a camera pose. In some embodiments, live pose estimation may involve identifying an object that is the subject of the selected frame. For example, the selected frame may feature a vehicle, a person, or another object. Live pose estimation may then involve estimating a camera position and orientation with respect to that object. Determining a camera's pose may involve, for instance, estimating factors such as distance between the camera and object along three dimensions. Alternately, or additionally, determining a camera's pose may involve, for instance, estimating factors such as orientation in three dimensions of the object with respect to the camera.

According to various embodiments, any of a variety of suitable techniques may be used to estimate a camera pose with respect to the object. For example, a simultaneous localization and mapping (SLAM) technique may be employed.

A determination is made at 210 as to whether to perform initialization. According to various embodiments, initialization may be performed for the first frame. Subsequently, initialization need not be performed. Alternately, initialization may be performed more than once. For example, initialization may be performed periodically so as to recalibrate the projection. As another example, initialization may be performed when it is determined that the live camera feed has changed more than a designated amount from the image present when initialization was last performed. As yet another example, initialization may be performed until a designated level of accuracy is reached in order to improve the triangulation operation.

When it is determined to perform initialization, a reference-to-live image correspondence is estimated at 212. According to various embodiments, a reference-to-live image correspondence may be determined based on the object represented in the live camera feed at operation 102. Any of a variety of techniques may be used to determine a correspondence between the reference image and the live image. Examples of such techniques may include, but are not limited to, those discussed with respect to the methods 1700, 1800, and 1900 shown in FIGS. 17, 18, and 19.

A 3D representation is triangulated from per-frame estimations at 214. For instance, in some embodiments one or more 2D skeleton joints estimated as part of the reference-to-live image correspondence at 210 may be triangulated into 3D skeleton joints.

If instead initialization is not performed, then triangulated points are projected into the current frame using camera pose information at 216. According to various embodiments, camera pose information may be determined using, for instance, inertial measurement unit (IMU) data.

In particular embodiments, one or both of operations 212 and 214 may be run only as part of an initialization phase in which the live camera view is calibrated. Alternately, or additionally, operations 212 and 214 may be run periodically or continually instead of, or in addition to, the projection of triangulated points into current frames. Such an approach may provide for improving and/or updating the triangulation over time.

At 216, augmented reality information is overlain on the current frame based on the 3D representation. In some implementations, the augmented reality information may be overlain by mapping the locations of the information identified at 104 to the live-camera view using the correspondence estimated at 212 and the 3D representation triangulated at 214.

A determination is made at 218 as to whether to continue performing augmented reality overlay. According to various embodiments, augmented reality overlay may continue to be performed until any of a variety of conditions are met. For example, user input may be received that indicates an explicit request to terminate augmented reality overlay. As another example, an object that is the subject of augmented reality overlay may move out of a camera's field of view, and the system may automatically terminate augmented reality overlay.

In particular embodiments, one or more operations may be performed instead of, or in addition to, one or more of the operations described in the method 200 shown in FIG. 2. For example, pose estimation may be performed as described with respect to the operation 208. Then, 2D skeleton detection on the live camera view may be performed. The skeleton may be triangulated to three dimensions, and then a mapping between tag locations and image locations may be performed through the 3D skeleton. As another example, pose estimation may be used in conjunction with a neural network configured to map locations in the live camera view to a top-down view of the object. After an initialization phase including at least several frames, the mapped locations may be triangulated. The position in subsequent frames may be estimated by projecting the estimated 3D location using the current camera pose. As yet another example, a bounding box and/or object orientation estimation procedure may be used to align images with a 3D model in each frame. As still another example, pose estimation may be used to determine an average location of a 3D model in 3D space.

Figure 3:
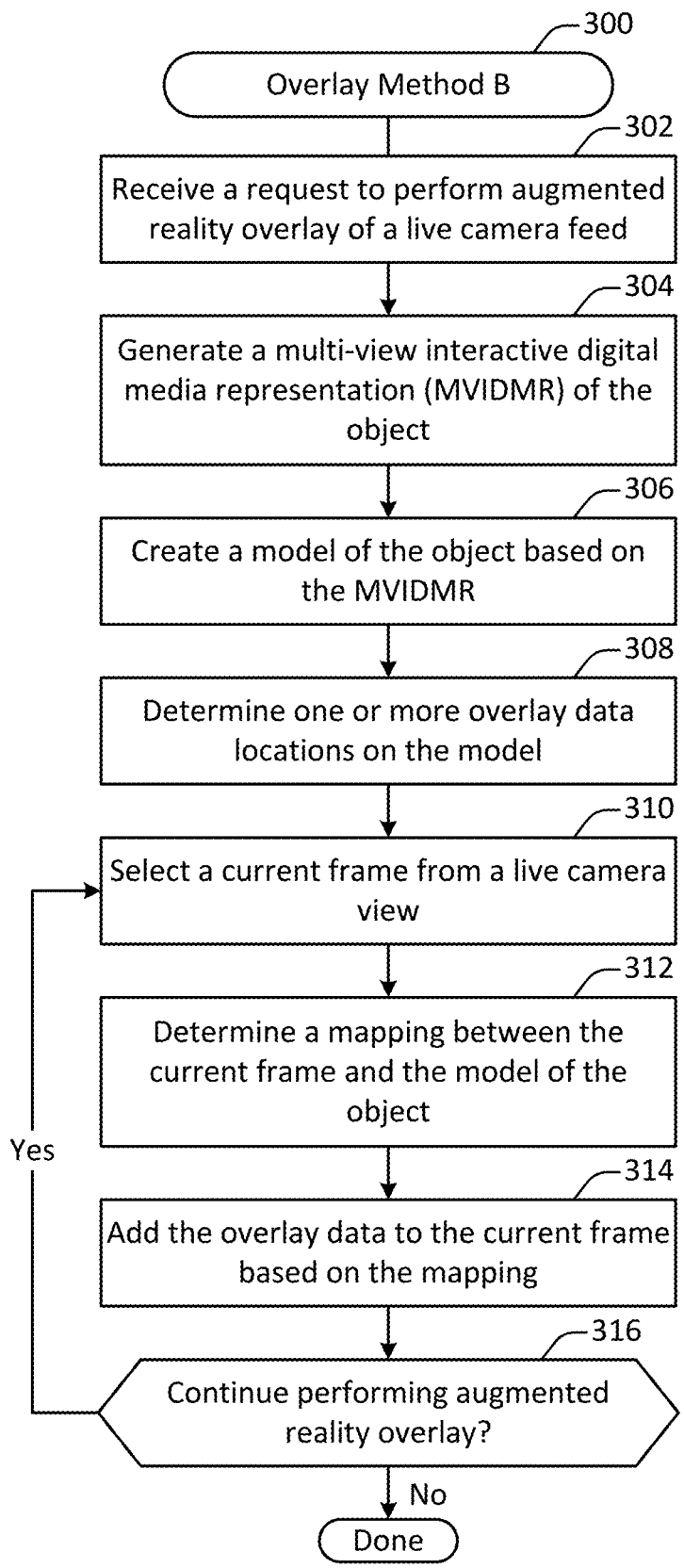
FIG. 3 illustrates one example of a method B for performing a live overlay, performed in accordance with one or more embodiments.

FIG. 3 illustrates one example of a method B 300 for performing a live overlay, performed in accordance with one or more embodiments. The method 300 may be performed on any suitable computing device. For example, the method 300 may be performed on a mobile computing device such as a smart phone, head-mounted display, or smart glasses. In some configurations, one or more devices may operate in coordination. For instance, a smart glasses or head-mounted display may operate in communication with a smart phone or other device to provide an augmented reality overlay of a live camera feed.

A request to perform augmented reality overlay of a live camera feed is received at 302. According to various embodiments, the request may be received as part of the operation of the method 100 shown in FIG. 1. For instance, the request may be received at operation 106.

A multi-view interactive digital media representation (MVIDMR) of the object is generated at 304. Techniques and mechanisms for creating an MVIDMR are described throughout the application as filed, for instance with respect to the FIGS. 5 through 7.

A model of the object is created based on the MVIDMR at 306. According to various embodiments, the model may be created by performing skeleton detection based on the MVIDMR. Techniques and mechanisms relating to skeleton detection are described in co-pending and commonly assigned U.S. patent application Ser. No. 15/427,026, titled SKELETON DETECTION AND TRACKING VIA CLIENT-SERVER COMMUNICATION, by Holzer et al., filed Feb. 7, 2017, which is hereby incorporated by reference in its entirety and for all purposes.

One or more overlay data locations on the model are determined at 308. According to various embodiments, the overlay data locations may be determined by mapping the locations associated with the overlay data determined at 104 to the object model determined at 308. For example, a mapping procedure such as those discussed with respect to the methods 1700, 1800, and/or 1900 shown in FIGS. 17, 18, and 19 may be performed.

A current frame is selected at 310. According to various embodiments, each or selected frames in a succession of live frames captured by a camera may be processed. In this way, augmented reality information may be overlain on the camera when the frame is presented on a display screen.

A mapping between the current frame and the model of the object is determined at 312. According to various embodiments, a mapping procedure such as those discussed with respect to the methods 1700, 1800, and/or 1900 shown in FIGS. 17, 18, and 19 may be performed to determine the mapping between the current frame and the object model.

At 314, the overlay data is added to the current frame based on the mapping. According to various embodiments, adding the overlay data to the current frame may involve determining whether a mapped location associated with a tag is located in the current frame. If so, the tag may be added to the current frame at the mapped location.

A determination is made at 316 as to whether to continue performing augmented reality overlay. According to various embodiments, augmented reality overlay may continue to be performed until any of a variety of conditions are met. For example, user input may be received that indicates an explicit request to terminate augmented reality overlay. As another example, an object that is the subject of augmented reality overlay may move out of a camera's field of view, and the system may automatically terminate augmented reality overlay.

In particular embodiments, one or more operations may be performed instead of, or in addition to, one or more of the operations described in the method 300 shown in FIG. 3. For example, image features may be matched to align visual data from a pre-capture phase with data from the live image stream. Such a matching may involve, for example, keypoint detection. The pre-capture phase may include the capture of data used to generate the MVIDMR at operation 304.

As another example, skeleton detection may be performed on pre-capture data to triangulate a 3D skeleton from multiple images. The 3D skeleton may then be used to map the image to reference data. In a live image, a 2D skeleton may be detected to compute a match between the pre-captured model and the current image.

As yet another example, a top-down mapping neural network may be run on pre-capture data to map the pre-capture data to a top-down view of the object and triangulate a 3D skeleton. The 3D skeleton may then be mapped to the reference data. In each live image, a 2D skeleton may be detected and then mapped to the 3D skeleton. Locations on tags may then be mapped to the 3D skeleton, and then to the 2D skeleton, and then to corresponding locations in the live frame.

As still another example, a bounding box may be used in conjunction with an object orientation estimation procedure to align the image with a 3D model in, for instance, pre-capture frames. The aligned image may then be used to compute an average estimate of the 3D model relative to camera poses in live camera images.

Figure 4:
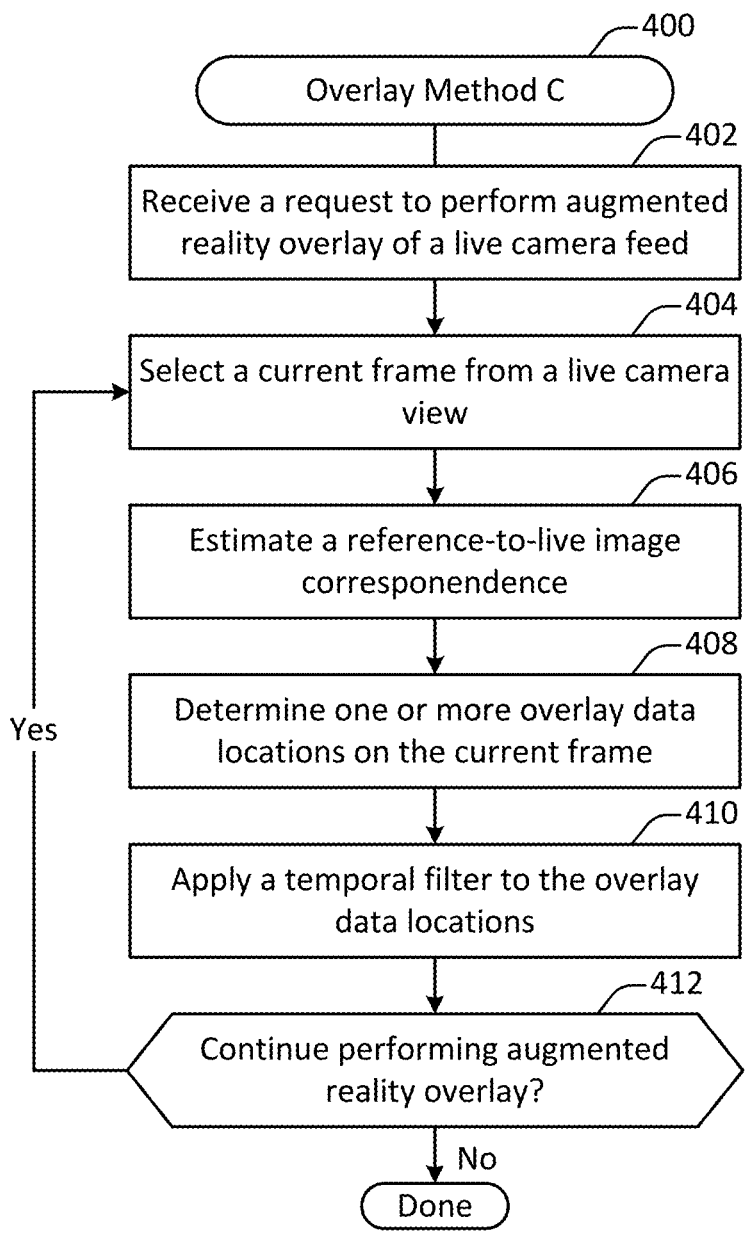
FIG. 4 illustrates one example of a method C for performing a live overlay, performed in accordance with one or more embodiments.

FIG. 4 illustrates one example of a method C 400 for performing a live overlay, performed in accordance with one or more embodiments. The method 400 may be performed on any suitable computing device. For example, the method 400 may be performed on a mobile computing device such as a smart phone, head-mounted display, or smart glasses. In some configurations, one or more devices may operate in coordination. For instance, a smart glasses or head-mounted display may operate in communication with a smart phone or other device to provide an augmented reality overlay of a live camera feed.

A request to perform augmented reality overlay of a live camera feed is received at 402. According to various embodiments, the request may be received as part of the operation of the method 100 shown in FIG. 1. For instance, the request may be received at operation 106.

A current frame is selected at 404. According to various embodiments, each or selected frames in a succession of live frames captured by a camera may be processed. In this way, augmented reality information may be overlain on the camera when the frame is presented on a display screen.

A reference-to-live image correspondence is estimated at 406 According to various embodiments, a reference-to-live image correspondence may be determined based on the object represented in the live camera feed at operation 102. Any of a variety of techniques may be used to determine a correspondence between the reference image and the live image. Examples of such techniques may include, but are not limited to, those discussed with respect to the methods 1700, 1800, and 1900 shown in FIGS. 17, 18, and 19.

In particular embodiments, a neural network may be used for each frame to map the object shown in the current image to a top-down image of the object. Alternately, or additionally, a bounding box and/or an object orientation estimation procedure may be used to align the image with a 3D model for each frame.

One or more overlay data locations on the current frame are determined at 408. According to various embodiments, adding the overlay data to the current frame may involve determining whether a mapped location associated with a tag is located in the current frame. If so, the tag may be added to the current frame at the location determined by the reference-to-live image correspondence estimated at 406.

A temporal filter is applied to the overlay data locations at 410. According to various embodiments, the temporal filter may be used to reduce jitter from single frame results and/or to generate a smooth visualization of the final result. The temporal filter may be applied by weighting or averaging displayed overlay data locations for the current frame based on overlay data locations determined in previous frames.

A determination is made at 412 as to whether to continue performing augmented reality overlay. According to various embodiments, augmented reality overlay may continue to be performed until any of a variety of conditions are met. For example, user input may be received that indicates an explicit request to terminate augmented reality overlay. As another example, an object that is the subject of augmented reality overlay may move out of a camera's field of view, and the system may automatically terminate augmented reality overlay.

According to various embodiments, the procedures and operations described in the FIGS. 1 through 4 may be performed in various combinations. For example, skeleton detection may be employed in one stage of a procedure, while top-down mapping is performed in another stage of the same procedure. As another example, live visualization can include multiple layers of information where different layers can be toggled on or off depending on user preferences or current context.

According to various embodiments, one or more of the methods described herein, such as the methods shown in FIGS. 1-4, may be used in conjunction with a device that has a depth sensor. A depth sensor may employ a technique such as projected infrared light to determine a distance from the device to a point represented in a camera view. Using such information, an object can be more readily identified, for instance by mapping the object to a three-dimensional model. In addition, depth sensor information may be used to help determine a correspondence between a tag location in reference data and a tag location on an object in a live camera feed.

Figure 5:
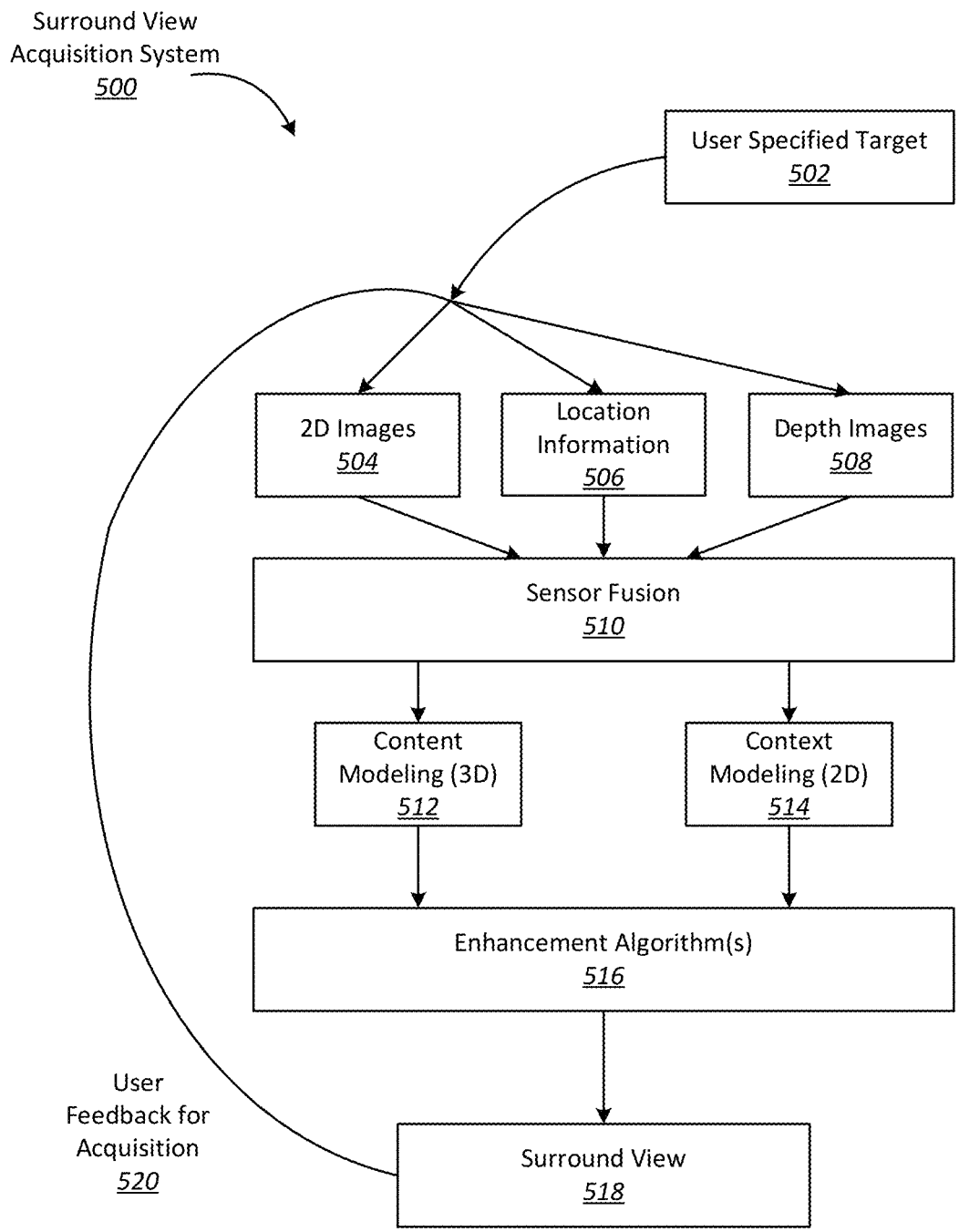
FIG. 5 illustrates an example of a surround view acquisition system configured in accordance with various embodiments.

With reference to FIG. 5, shown is an example of a surround view acquisition system that can be used to generate a multi-view interactive digital media representation that can be used for the application of filters or visual effects. A multi-view interactive digital media representation includes much more information than a single image. Whereas a single image may include information such as a grid of color pixels and the date/time of capture, a multi-view interactive digital media representation includes information such as such as grids of color pixels, date/time of capture, spatial information (flow/3D), location, and inertial measurement unit information (IMU) (i.e., compass, gravity, orientation). A multi-view interactive digital media representation brings focus to an object of interest because it provides separation between the foreground and background. In addition, a multi-view interactive digital media representation provides more information about the scale, context, and shape of the object of interest. Furthermore, by providing multiple views, aspects of the object that are not visible from a single view can be provided in a multi-view interactive digital media representation.

In the present example embodiment, the surround view acquisition system 500 is depicted in a flow sequence that can be used to generate a surround view. According to various embodiments, the data used to generate a surround view can come from a variety of sources. In particular, data such as, but not limited to two-dimensional (2D) images 504 can be used to generate a surround view. These 2D images can include color image data streams such as multiple image sequences, video data, etc., or multiple images in any of various formats for images, depending on the application. Another source of data that can be used to generate a surround view includes location information 506. This location information 506 can be obtained from sources such as accelerometers, gyroscopes, magnetometers, GPS, Wi-Fi, IMU-like systems (Inertial Measurement Unit systems), and the like. Yet another source of data that can be used to generate a surround view can include depth images 508. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 510. In some embodiments, a surround view can be generated a combination of data that includes both 2D images 504 and location information 506, without any depth images 508 provided. In other embodiments, depth images 508 and location information 506 can be used together at sensor fusion block 510. Various combinations of image data can be used with location information at 506, depending on the application and available data.

In the present example embodiment, the data that has been fused together at sensor fusion block 510 is then used for content modeling 512 and context modeling 514. During this process, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 512 and context modeling 514 can be generated by combining the image and location information data.

According to various embodiments, context and content of a surround view are determined based on a specified object of interest. In some examples, an object of interest is automatically chosen based on processing of the image and location information data. For instance, if a dominant object is detected in a series of images, this object can be selected as the content. In other examples, a user specified target 502 can be chosen. It should be noted, however, that a surround view can be generated without a user specified target in some applications.

In the present example embodiment, one or more enhancement algorithms can be applied at enhancement algorithm(s) block 516. In particular example embodiments, various algorithms can be employed during capture of surround view data, regardless of the type of capture mode employed. These algorithms can be used to enhance the user experience. For instance, automatic frame selection, stabilization, view interpolation, filters, and/or compression can be used during capture of surround view data. In some examples, these enhancement algorithms can be applied to image data after acquisition of the data. In other examples, these enhancement algorithms can be applied to image data during capture of surround view data.

According to particular example embodiments, automatic frame selection can be used to create a more enjoyable surround view. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, stabilization can be used for a surround view in a manner similar to that used for video. In particular, key frames in a surround view can be stabilized to produce improvements such as smoother transitions, improved/enhanced focus on the content, etc. However, unlike video, there are many additional sources of stabilization for a surround view, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a surround view. Because points of interest in a surround view are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for surround views. For instance, key points can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a surround view is often focused on a particular object of interest, a surround view can be content-weighted so that the object of interest is maximally stabilized in some examples.

Another way to improve stabilization in a surround view includes direct selection of a region of a screen. For instance, if a user taps to focus on a region of a screen, then records a convex surround view, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, mouth) can be used as areas to stabilize, rather than using generic key points.

According to various examples, view interpolation can be used to improve the viewing experience. In particular, to avoid sudden "jumps" between stabilized frames, synthetic, intermediate views can be rendered on the fly. This can be informed by content-weighted key point tracks and IMU information as described above, as well as by denser pixel-to-pixel matches. If depth information is available, fewer artifacts resulting from mismatched pixels may occur, thereby simplifying the process. As described above, view interpolation can be applied during capture of a surround view in some embodiments. In other embodiments, view interpolation can be applied during surround view generation.

In some examples, filters can also be used during capture or generation of a surround view to enhance the viewing experience. Just as many popular photo sharing services provide aesthetic filters that can be applied to static, two-dimensional images, aesthetic filters can similarly be applied to surround images. However, because a surround view representation is more expressive than a two-dimensional image, and three-dimensional information is available in a surround view, these filters can be extended to include effects that are ill-defined in two dimensional photos. For instance, in a surround view, motion blur can be added to the background (i.e. context) while the content remains crisp. In another example, a drop-shadow can be added to the object of interest in a surround view.

In various examples, compression can also be used as an enhancement algorithm 516. In particular, compression can be used to enhance user-experience by reducing data upload and download costs. Because surround views use spatial information, far less data can be sent for a surround view than a typical video, while maintaining desired qualities of the surround view. Specifically, the IMU, key point tracks, and user input, combined with the view interpolation described above, can all reduce the amount of data that must be transferred to and from a device during upload or download of a surround view. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a surround view 518 is generated after any enhancement algorithms are applied. The surround view can provide a multi-view interactive digital media representation. In various examples, the surround view can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view. In particular example embodiments, the characteristics described above can be incorporated natively in the surround view representation, and provide the capability for use in various applications. For instance, surround views can be used in applying filters or visual effects.

According to various example embodiments, once a surround view 518 is generated, user feedback for acquisition 520 of additional image data can be provided. In particular, if a surround view is determined to need additional views to provide a more accurate model of the content or context, a user may be prompted to provide additional views. Once these additional views are received by the surround view acquisition system 500, these additional views can be processed by the system 500 and incorporated into the surround view.

Figure 6:
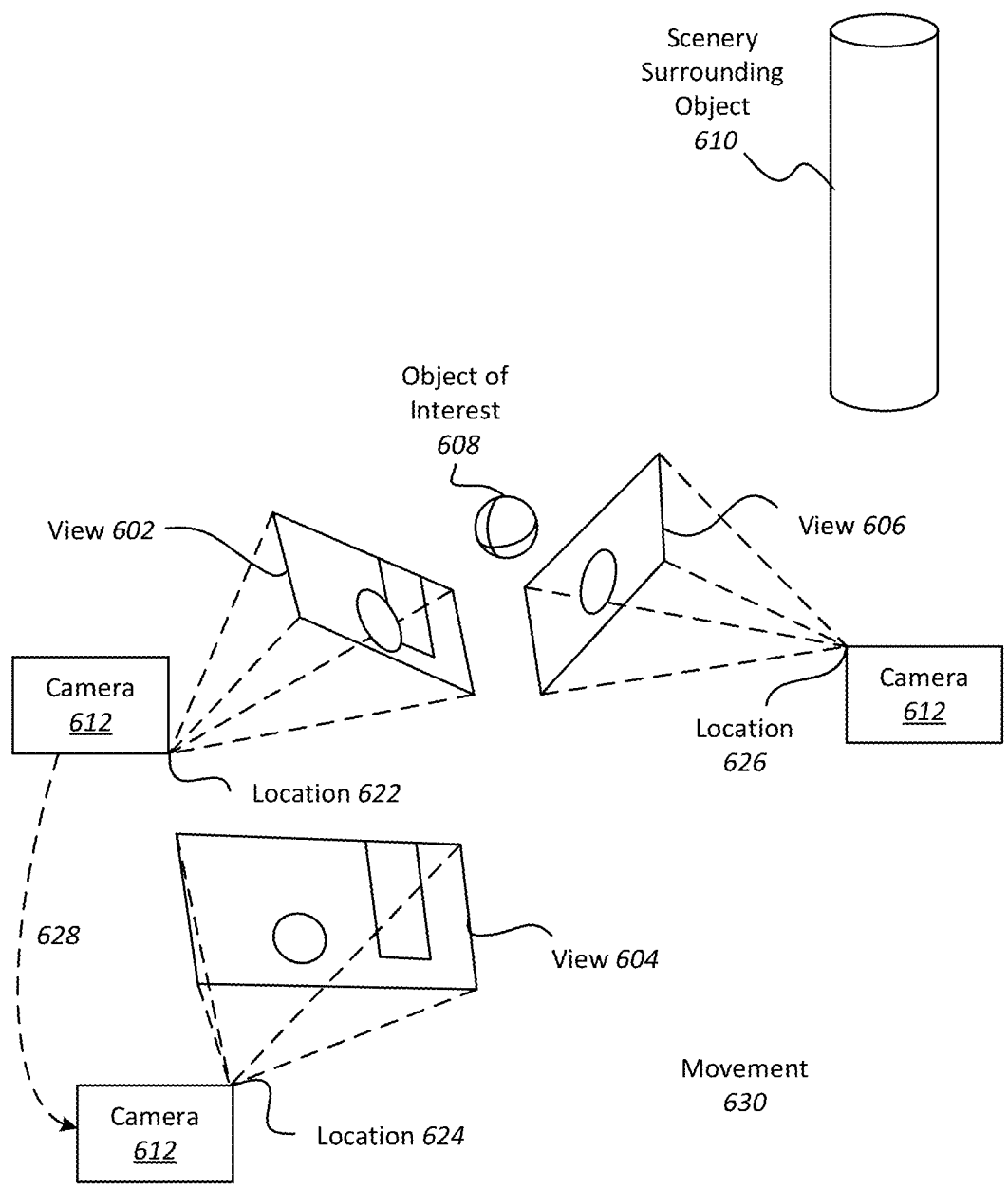
FIG. 6 illustrates an example of a device capturing multiple views of an object of interest.

With reference to FIG. 6, shown is an example of a device capturing multiple views of an object of interest from different locations. The capture device is indicated as camera 612, and moves from location 622 to location 624 and from location 624 to location 626. The multiple camera views 602, 604, and 606 captured by camera 612 can be fused together into a three-dimensional (3D) model. According to various embodiments, multiple images can be captured from various viewpoints and fused together to provide a multi-view digital media representation.

In the present example embodiment, camera 612 moves to locations 622, 624, and 626, respectively, along paths 628 and 630, in proximity to an object of interest 608. Scenery can surround the object of interest 608 such as object 608. Views 602, 604, and 606 are captured by camera 612 from locations 622, 624, and 626 and include overlapping subject matter. Specifically, each view 602, 604, and 606 includes the object of interest 608 and varying degrees of visibility of the scenery surrounding the object 610. For instance, view 602 includes a view of the object of interest 608 in front of the cylinder that is part of the scenery surrounding the object 608. View 604 shows the object of interest 608 to one side of the cylinder, and view 606 shows the object of interest without any view of the cylinder.

In the present example embodiment, the various views 602, 604, and 606 along with their associated locations 622, 624, and 626, respectively, provide a rich source of information about object of interest 608 and the surrounding context that can be used to produce a multi-view digital media representation, such as a surround view. For instance, when analyzed together, the various views 602, 604, and 606 provide information about different sides of the object of interest and the relationship between the object of interest and the scenery. These views also provide information about the relative size and scale of the object of interest in relation to the scenery. Furthermore, views from different sides of the object provide information about the shape and texture of the object. According to various embodiments, this information can be used to parse out the object of interest 608 into content and the scenery 610 as the context. In particular examples, the content can then be used for applying filters.

When the images of the object are captured from the different viewpoints as shown in FIG. 6, the images can then be processed for create a multi-view interactive visual media representation (MVIDMR). To create the MVIDMR, inertial measurement unit (IMU) data such as acceleration and orientation may be used in conjunction with visual data to position images relative to each other in space. For instance, key points in successive images may be identified and aligned. The MVIDMR may then be navigated in one or more dimensions, for instance by swiping left, right, up, or down in a user interface.

Figure 7:
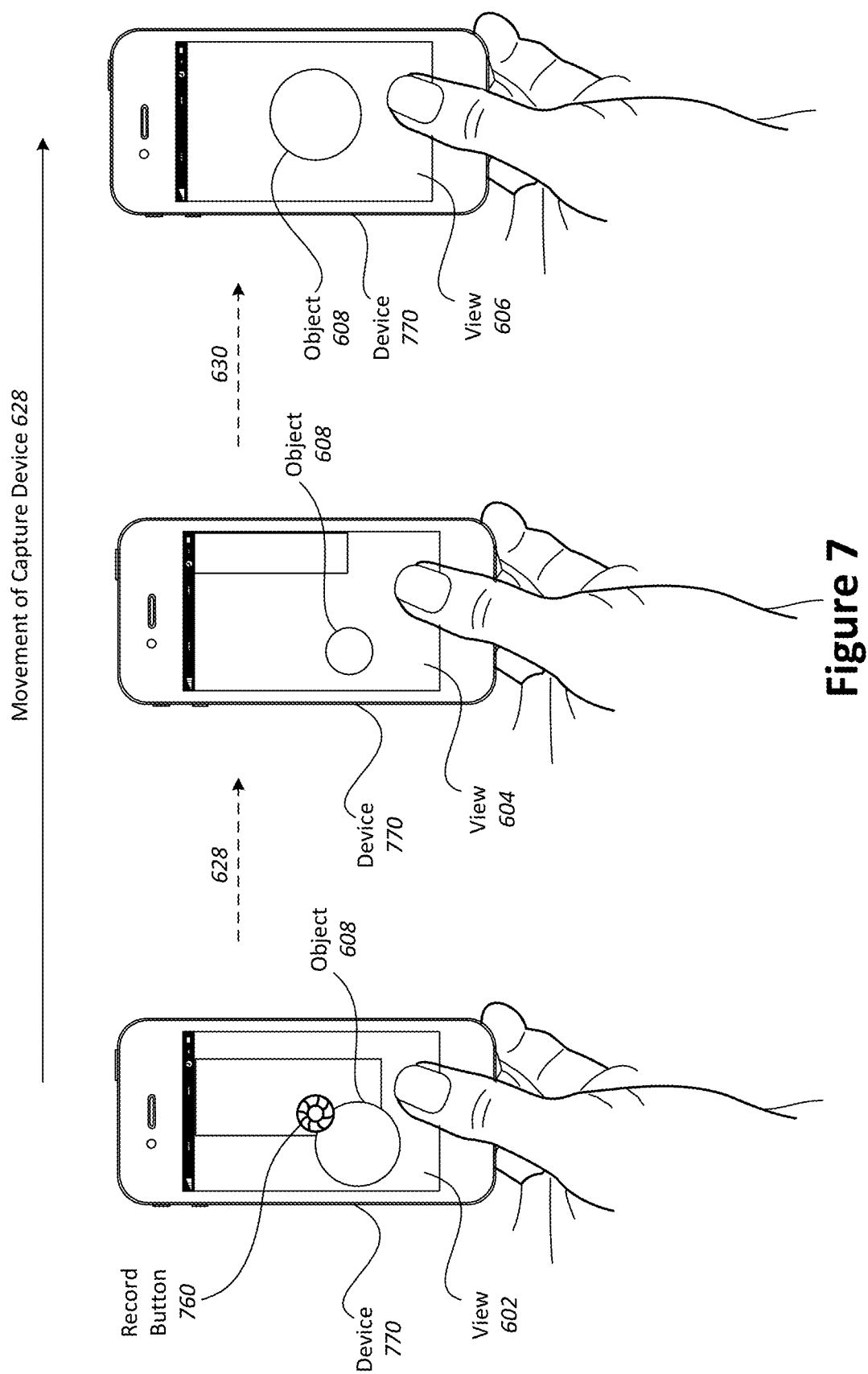
FIG. 7 illustrates an example of a device capturing views of an object of interest to create a multi-view media representation to which a filter may be applied.

With reference to FIG. 7, shown is an example of a device capturing views of an object of interest. During a filter session, multiple views of the object 708 may be captured by the device 770 from different locations. In the present example, data is acquired when a user taps a record button 780 on capture device 770 to begin recording images of the object.

The user moves 628 the capture device 770 from location 622 to location 624 along path 628 and from location 624 to location 626 along path 630. As described in more detail throughout this application, filtering can be provided at the device 770, and prompts for the user to capture particular views can be provided during the session. In particular, the system can prompt the user to move the device 770 in a particular direction or may prompt the user to provide additional information. As the user records different views of the object, filtering suggestions may be reiteratively refined to provide accurate results. The user may choose to stop recording by tapping the record button 780 again. In other examples, the user can tap and hold the record button during the session, and release to stop recording. In the present embodiment, the recording captures a series of images that can be used to generate a multi-view digital media representation that can be for filtering either in real-time or after-the-fact.

In some implementations, applying a filter to a multi-view digital media representation may involve processing a succession of images taken from different perspectives. In such an example, the client device may perform low-level processing such as two-dimensional analysis of individual images. The server, on the other hand, may perform high-level processing such as combining different individual images to produce a three-dimensional model of an object that is the subject of a multi-view video.

Figure 8:
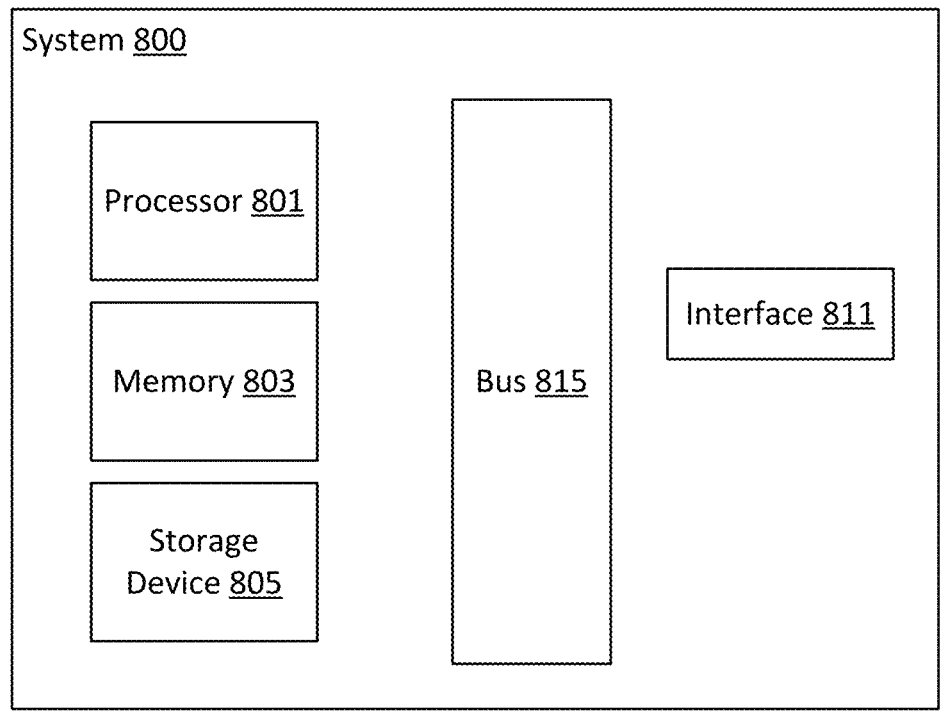
FIG. 8 illustrates a particular example of a computer system configured in accordance with various embodiment.

With reference to FIG. 8, shown is a particular example of a computer system that can be used to implement particular examples of the present invention. For instance, the computer system 800 can be used to map views between images according to various embodiments described above. According to particular example embodiments, a system 800 suitable for implementing particular embodiments of the present invention includes a processor 801, a memory 803, a communications interface 811, and a bus 815 (e.g., a PCI bus). The interface 811 may include separate input and output interfaces, or may be a unified interface supporting both operations. When acting under the control of appropriate software or firmware, the processor 801 is responsible for such tasks such as optimization. Various specially configured devices can also be used in place of a processor 801 or in addition to processor 801. The complete implementation can also be done in custom hardware. The communications interface 811 is typically configured to send and receive data packets or data segments over a network. Particular examples of interfaces the device supports include Ethernet interfaces, frame relay interfaces, cable interfaces, DSL interfaces, token ring interfaces, and the like. The storage device 805 is configured to store information on one or more non-transitory storage media such as a hard disk or network attached storage system.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 800 uses memory 803 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Figure 16:
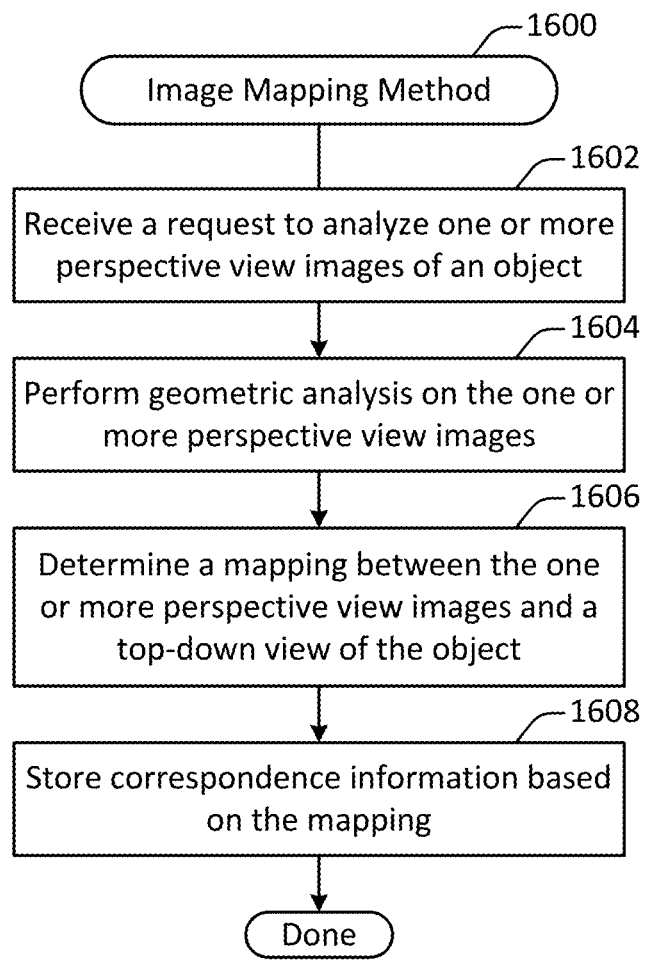
FIG. 16 illustrates one example of an image mapping method, performed in accordance with one or more embodiments.

FIG. 16 illustrates one example of an image method 1600, performed in accordance with one or more embodiments. The method 1600 may be performed at a computing device such as a client machine or a server. The client machine may be a mobile computing device such as a mobile phone. The method 1600 may be used to determine and apply a mapping between one or more perspective views of an object and one or more other images, such as a top-down image or a standard perspective view of the object.

A request to analyze one or more perspective view images of an object is received at 1602. According to various embodiments, the analysis may involve operations other than view mapping. For example, view mapping may be used as part of a larger procedure that involves operations such as damage detection, tag translation, tag propagation, or standard image generation.

In some implementations, the request may be generated automatically. For instance, an automated procedure for detecting damage to an object may automatically generate a request to map a perspective view of the object to a top-down view. Alternately, the request may be generated manually. For instance, a user may provide user input indicating a request to map a perspective view of an object to a top-down or standard perspective view of the object.

Geometric analysis on the one or more perspective view images is performed at 1604. In some implementations, the geometric analysis may involve object identification, mesh definition, skeleton construction, and/or other such operations. Additional details regarding the performance of geometric analysis on a perspective view image are discussed with respect to the method 1700 shown in FIG. 17.

A mapping between the one or more perspective view images and the top-down view of the object is determined at 1606. Alternately, a mapping between the one or more perspective view images and one or more different perspective view images (e.g., standard perspective views) may be determined. According to various embodiments, different types of processes may be used when dealing with top-down views. An "image to top-down" mapping process is one in which the pixels in a perspective image of the object are mapped to their corresponding locations in a top-down view of the object. In contrast, a "top-down to image" mapping process is one in which a position from the top-down image is mapped to the corresponding position in a perspective image of the object. Techniques related to image to top-down mapping are discussed in additional detail with respect to FIG. 18. Techniques related to top-down to image mapping are discussed in additional detail with respect to FIG. 19.

Correspondences information based on the mapping is stored at 1608. According to various embodiments, storing the correspondence information may involve one or more of a variety of operations that may include, but are not limited to: transmitting correspondence information over a network via a communication interface, sending an instruction to store correspondence information on a storage device such as a hard disk, and storing correspondence information in memory on a computing device. In some implementations, additional analysis may be performed using the correspondence information, such as image tagging or object damage detection.

Figure 17:
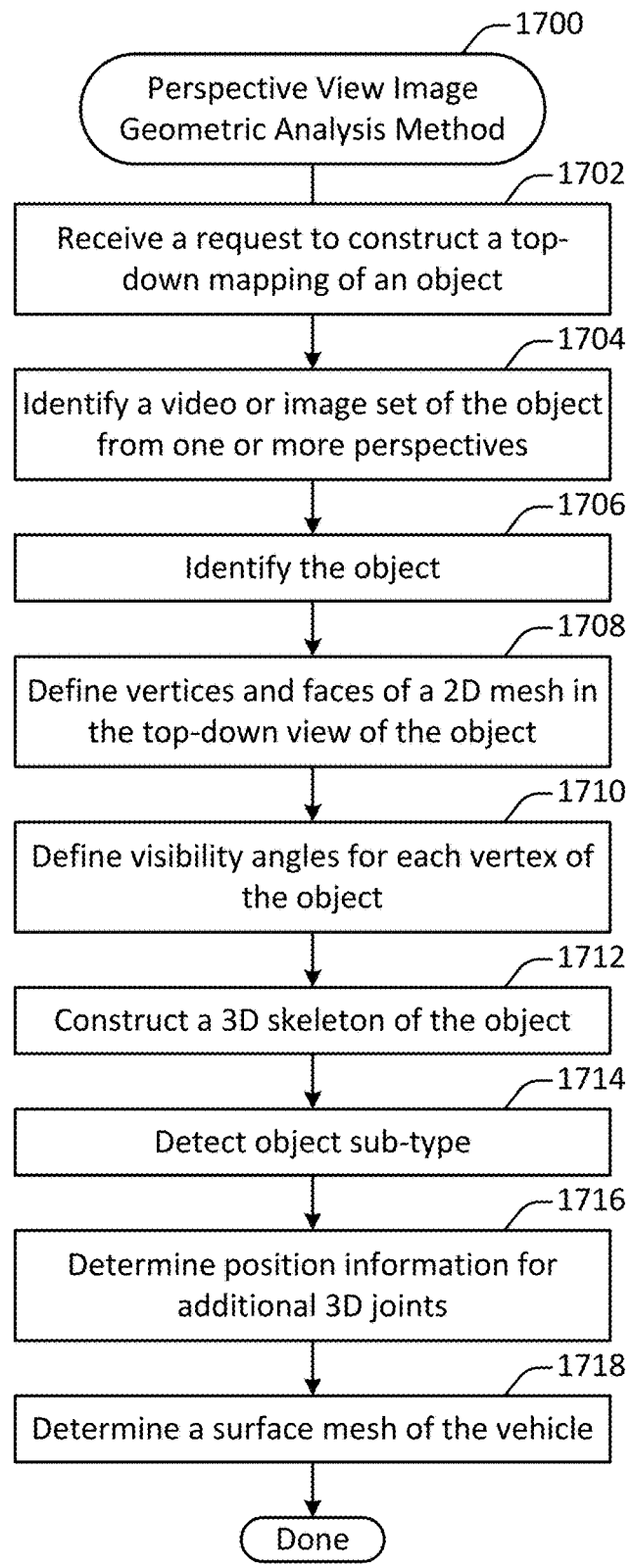
FIG. 17 illustrates one example of a method for performing geometric analysis of a perspective view image, performed in accordance with one or more embodiments.

FIG. 17 illustrates one example of a method 1700 for performing geometric analysis of a perspective view image, performed in accordance with one or more embodiments. The method 1700 may be performed on any suitable computing device. For example, the method 1700 may be performed on a mobile computing device such as a smart phone. Alternately, or additionally, the method 1700 may be performed on a remote server in communication with a mobile computing device.

A request to construct a top-down mapping of an object is received at 1702. According to various embodiments, the request may be received at a user interface. The request may be generated as discussed with respect to operation 1604 shown in FIG. 16.

At 1704, a video or image set of the object captured from one or more perspectives is identified. The video or image set is referred to herein as "source data". According to various embodiments, the source data may include a 360-degree view of the object. Alternately, the source data may include a view that has less than 360-degree coverage.

In some embodiments, the source data may include data captured from a camera. For example, the camera may be located on a mobile computing device such a mobile phone. As another example, one or more traditional cameras may be used to capture such information.

In some implementations, the source data may include data collected from an inertial measurement unit (IMU). IMU data may include information such as camera location, camera angle, device velocity, device acceleration, or any of a wide variety of data collected from accelerometers or other such sensors.

The object is identified at 1706. In some implementations, the object may be identified based on user input. For example, a user may identify the object as a vehicle or person via a user interface component such as a drop-down menu.

In some embodiments, the object may be identified based on image recognition. For example, the source data may be analyzed to determine that the subject of the source data is a vehicle, a person, or another such object. The source data may include a variety of image data. However, in case of a multi-view capture the source data focuses in a particular object from different viewpoints, the image recognition procedure may identify commonalities between the different perspective views to isolate the object that is the subject of the source data from other objects that are present in some portion of the source data but not in other portions of the source data.

At 1708, vertices and faces of a 2D mesh are defined in the top-down view of the object. According to various embodiments, each face may represent a part of the object surface that could be approximated as being planar. For example, when a vehicle is captured in the source data, the vehicle's door panel or roof may be represented as a face in a 2D mesh because the door and roof are approximately planar despite being slightly curved.

In some embodiments, vertices and faces of a 2D mesh may be identified by analyzing the source data. Alternately, or additionally, the identification of the object at 1706 may allow for the retrieval of a predetermined 2D mesh. For example, a vehicle object may be associated with a default 2D mesh that may be retrieved upon request.

Visibility angles are determined for each vertex of the object at 1710. According to various embodiments, a visibility angle indicates the range of object angles with respect to the camera for which the vertex is visible. In some embodiments, visibility angles of a 2D mesh may be identified by analyzing the source data. Alternately, or additionally, the identification of the object at 1706 may allow for the retrieval of predetermined visibility angle along with a predetermined 2D mesh. For example, a vehicle object may be associated with a default 2D mesh with associated visibility angle that may be retrieved upon request.

A 3D skeleton of the object is constructed at 1712. According to various embodiments, constructing a 3D skeleton may involve any of a variety of operations. For example, 2D skeleton detection may be performed on every frame using a machine learning procedure. As another example, 3D camera pose estimation may be performed to determine a location and angle of the camera with respect to the object for a particular frame. As yet another example, a 3D skeleton may be reconstructed from 2D skeletons and or poses. Additional details regarding skeleton detection are discussed in co-pending and commonly assigned U.S. patent application Ser. No. 15/427,026, titled "Skeleton Detection and Tracking via Client-server Communication" by Holzer et al, filed Feb. 7, 2017, which is hereby incorporated by reference in its entirety and for all purposes.

Figure 9:
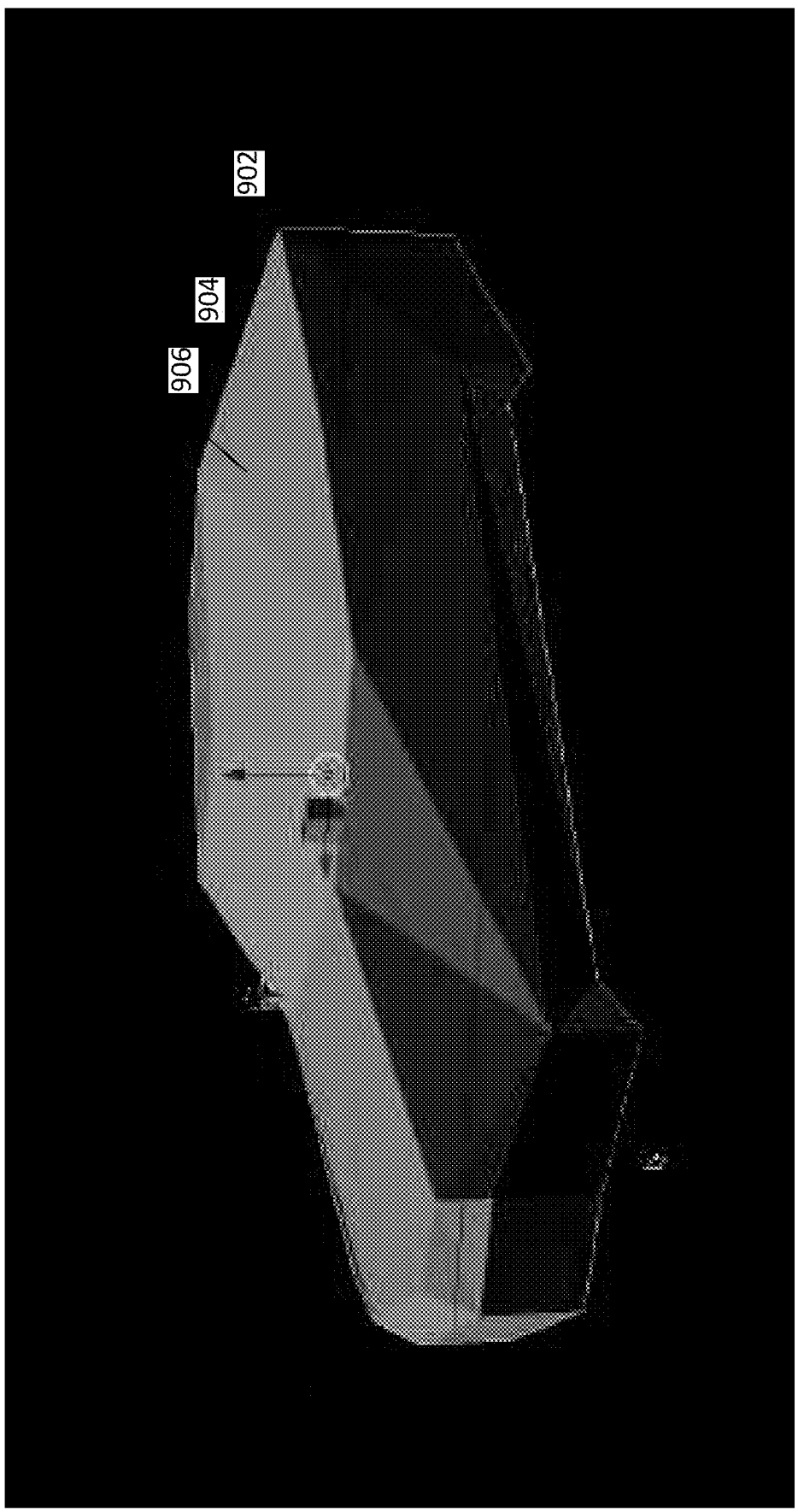
FIG. 9, FIG. 10, FIG. 11, FIG. 12, FIG. 13, FIG. 14, and FIG. 15 illustrate images processed in accordance with one or more embodiments.

FIG. 9 illustrates an example of a 3D mesh of an object whose vertices correspond to the joints of the 3D skeleton of the object. According to various embodiments, a 3D mesh may include vertices, edges, and faces that collectively represent an abstract projection of one or more 2D images of an object into three dimensions. For example, the 3D mesh shown in FIG. 9 includes a vertex 902, an edge 904, and a face 906. In particular embodiments, the joints' 3D position (i.e. the 3D skeleton) vary between object instances, while the connectivity between the joints (that are the mesh faces) may be defined once for an object category. For example, the mesh faces may be the same for every vehicle, or every vehicle of a particular type.

Techniques and mechanisms described are sometimes described with respect to source data that includes video and/or multiple images captured from different viewpoints. However, in some implementations techniques and mechanisms described herein may be applied to source data that includes a single image. For example, a 2D skeleton may be determined based on an image. Then, a 3D mesh may be defined that allows the mapping of information from the top-down view to the 3D mesh (or vice versa).

In some embodiments, because a single image makes constructing a 3D model of the skeleton more difficult, the detected 2D skeleton may be treated as the projection of the 3D model of the skeleton and used accordingly to propagate the points. Alternately, machine learning may be used to directly detect a 3D skeleton from a single image. Such an approach may be applied, for instance, by training a machine learning model based supplying a set of input images and resulting 3D skeletons constructed based on a more complete set of images.

In some implementations, a 3D surface mesh model of an object may be available. For example, such a mesh model may be computed through segmentation and space carving or through other 3D reconstruction methods. This 3D surface mesh model may more precisely follow the surface of an actual object than the 3D skeleton mesh model. Accordingly, the mapping procedure may identify the nearest surface mesh points to the skeleton joints and then define a mapping from the skeleton mesh to the surface mesh (or vice versa) using those skeleton joints to surface mesh correspondences. This mapping may be used to facilitate improved point or pixel mapping.

In some embodiments, a deep learning algorithm may directly predict a dense 3D semantic mesh. Such a mesh may be referred to as semantic because every predicted mesh vertex may correspond to a known and/or predetermined position in the top-down image. However, the predicted mesh may be substantially deeper than a conventional skeleton mesh of an object, and may more accurately follow the object shape. A dense 3D mesh may be predicted from a single image. If multiple frames are available, estimates from different frames may be merged to obtain a more accurate mesh.

In some implementations, a mesh predicted in the camera frame may be projected directly onto the image, obtaining a 2D mesh overlaid to the frame. Alternately, a mesh predicted in a difference frame can be used to obtain 3D-2D correspondence mappings between mesh 3D vertices and their corresponding location in the image, and then involve solving a Perspective-N-Point problem that yields the transformation to the camera frame.

In particular embodiments, applying a deep learning algorithm to directly predict a dense 3D semantic mesh may rely on the fact that the same vertices are defined in the perspective and in the top-down image. Accordingly, mapping in both ways (top-down to image and image to top-down) may be accomplished by expressing the interest point with barycentric coordinates with respect to the three closest vertices in that domain and then applying the same coordinates based on the corresponding vertices in the other domain. Therefore, applying a deep learning algorithm to directly predict a dense 3D semantic mesh may provide the speed advantages of determining a skeleton mesh but the improved accuracy of a fully reconstructed mesh. In addition, mapping may be performed from a single frame.

Returning to FIG. 17, an object sub-type is detected at 1714. In some embodiments, an object sub-type may be a refinement of the object identification performed at 1706 based on the additional information defined and determined at operations 1708-1712. For example, a vehicle object type may be refined to reflect a body type such as a sedan, a sports utility vehicle, or a pickup truck.

According to various embodiments, an object sub-type may be identified in any of various ways. For example, an object sub-type may be automatically detected from the 3D skeleton. As another example, an object sub-type may be identified based on user input. As another example, an object sub-type may be identified based on a machine learning algorithm, which may be applied to the original source data and/or to refines of the source data such as the 3D skeleton.

If necessary, position information for additional 3D joints is determined at 1716. According to various embodiments, the position of additional 3D joints may be inferred from the existing 3D skeleton. For example, a 3D skeleton of a vehicle may reveal that the vehicle has four wheels, even if a wheel is not visible in the source data. In this way, the final 3D skeleton may be expanded to include all of the vertices of the mesh defined in the top-down image.

In some implementations, the inference of additional 3D joints may depend on the object sub-type. For example, a pickup truck may have different 3D joints than a sedan or sports utility vehicle.

A surface mesh of the vehicle is determined at 1718. According to various embodiments, the surface mesh may be determined by using the 3D skeleton joints as vertices of the mesh. For example, each face of the mesh may approximate the object shape with a planar surface. FIG. 9 shows an example of a surface mesh.

According to various embodiments, one or more of the operations shown in FIG. 17 may be omitted. For example, a vehicle subtype need not necessarily be determined. In some implementations, one or more of the operations shown in FIG. 17 may be performed in an order different than that shown. For example, an object sub-type may be determined prior to constructing a 3D skeleton, and the object sub-type used to facilitate the construction of the 3D skeleton. As another example, one or more operations may be performed in parallel.

Figure 18:
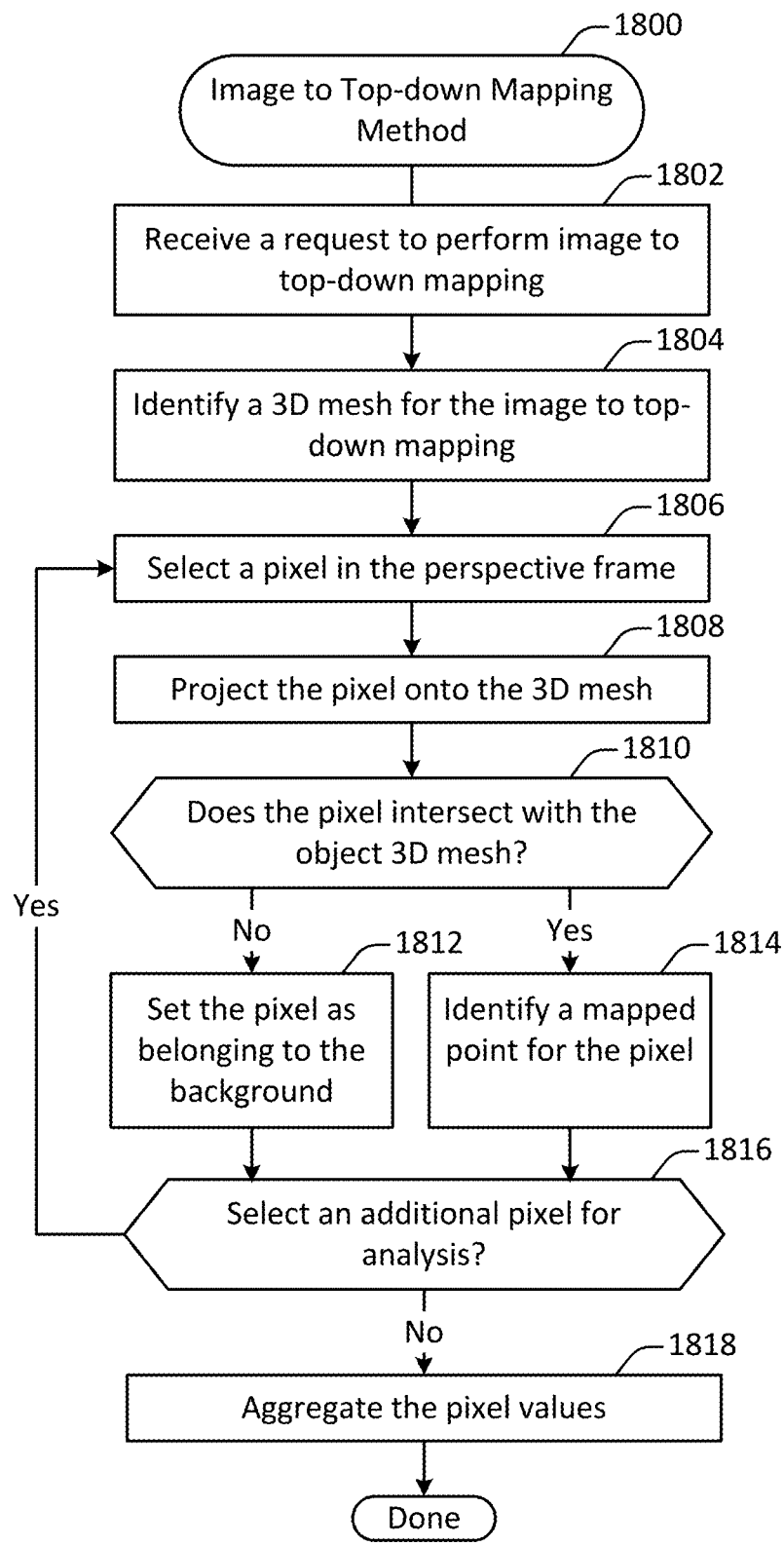
FIG. 18 illustrates one example of a method for performing perspective image to top-down view mapping, performed in accordance with one or more embodiments.

FIG. 18 illustrates one example of a method 1800 for performing perspective image to top-down view mapping, performed in accordance with one or more embodiments. In some embodiments, the method 1800 may be performed to map each pixel of an object represented in a perspective view to the corresponding point in a predefined top-down view of that class of objects.

The method 1800 may be performed on any suitable computing device. For example, the method 1800 may be performed on a mobile computing device such as a smart phone. Alternately, or additionally, the method 1800 may be performed on a remote server in communication with a mobile computing device.

A request to construct a top-down mapping of an object is received at 1802. According to various embodiments, the request may be generated after the performance of geometric analysis as discussed with respect to the method 1700 shown in FIG. 17. For example, the request may be generated as discussed with respect to the operation 1606 shown in FIG. 16. The request may identify one or more images for which to perform the top-down mapping. For example, the images used to perform the geometric analysis discussed with respect to FIG. 16 may be used for image to top-down mapping.

A 3D mesh for the image to top-down mapping is identified at 1804. The 3D mesh may be constructed as discussed with respect to the method 1700 shown in FIG. 17. The 3D mesh may provide a three-dimensional representation of the object and serve as an intervening representation between the actual perspective view image and the top-down view.

At 1806, a pixel in the perspective frame is selected for analysis. According to various embodiments, pixels may be selected in any suitable order. For example, pixels may be selected sequentially. As another example, pixels may be selected based on characteristics such as location or color. Such a selection process may facilitate faster analysis by focusing the analysis on portions of the image most likely to be present in the 3D mesh.

The pixel is projected onto the 3D mesh at 1808. In some implementations, projecting the pixel onto the 3D mesh may involve simulating a camera ray passing by the pixel position in the image plan and into the 3D mesh. Upon simulating such a camera ray, barycentric coordinates of the intersection point with respect to the vertices of the intersection face may be extracted.

A determination is made at 1810 as to whether the pixel intersects with the object 3D mesh. If the pixel does not intersect with the object 3D mesh, then at 1812 the pixel is set as belonging to the background. If instead the pixel does intersect with the object 3D mesh, then at 1814 a mapped point is identified for the pixel. According to various embodiments, a mapped point may be identified by applying the barycentric coordinates as weights for the vertices of the corresponding intersection face in the top-down image.

In some embodiments, a machine learning approach may be used to perform image to top-down mapping on a single image. For example, a machine learning algorithm such as deep net may be run on the perspective image as a whole. The machine learning algorithm may identify 2D locations of each pixel (or a subset of them) in the top-down image.

In some implementations, a machine learning approach may be used to perform top-down to image mapping. For example, given a perspective image and a point of interest in the top-down image, the machine learning algorithm may be run on the perspective image for identifying the top-down locations of its points. Then, the point of interest in the top-down image may be mapped to the perspective image.

In some embodiments, mapping the point of interest in the top-down image to the perspective image may involve first selecting the points in the perspective image whose top-down mapping is closest to the interest point. Then, the selected points in the perspective image may be interpolated.

Figure 13:
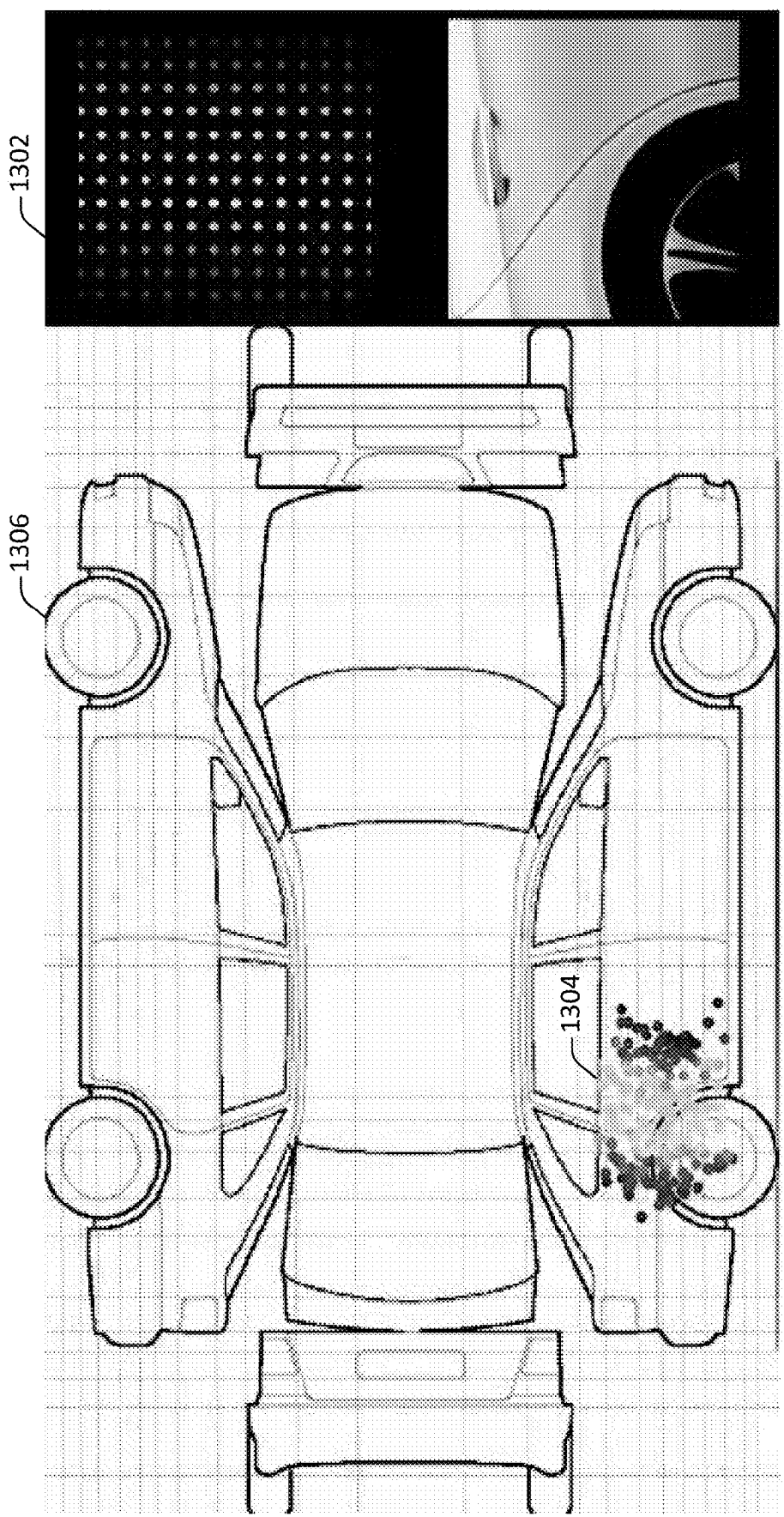
Figure 14:
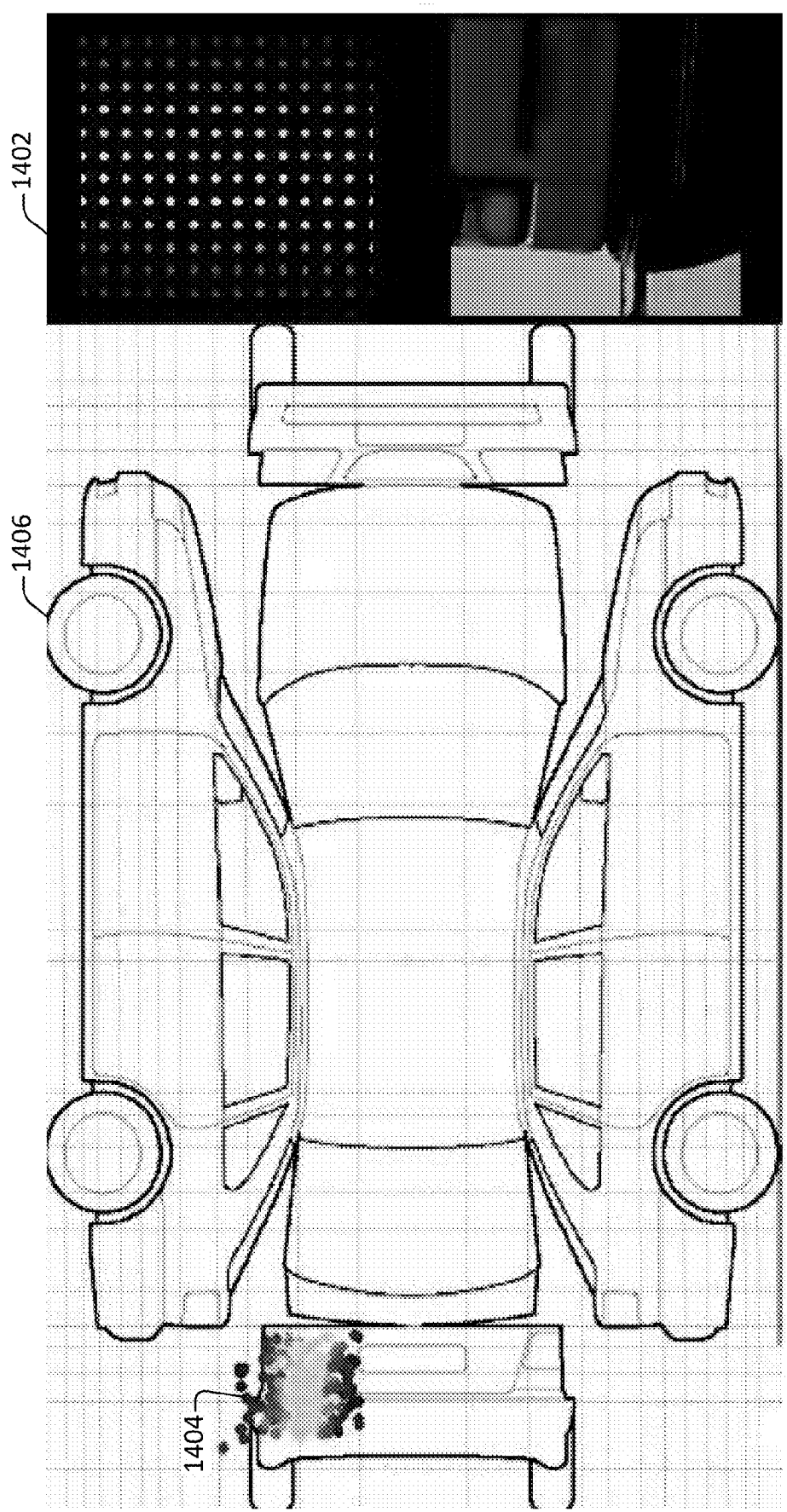
Figure 15:
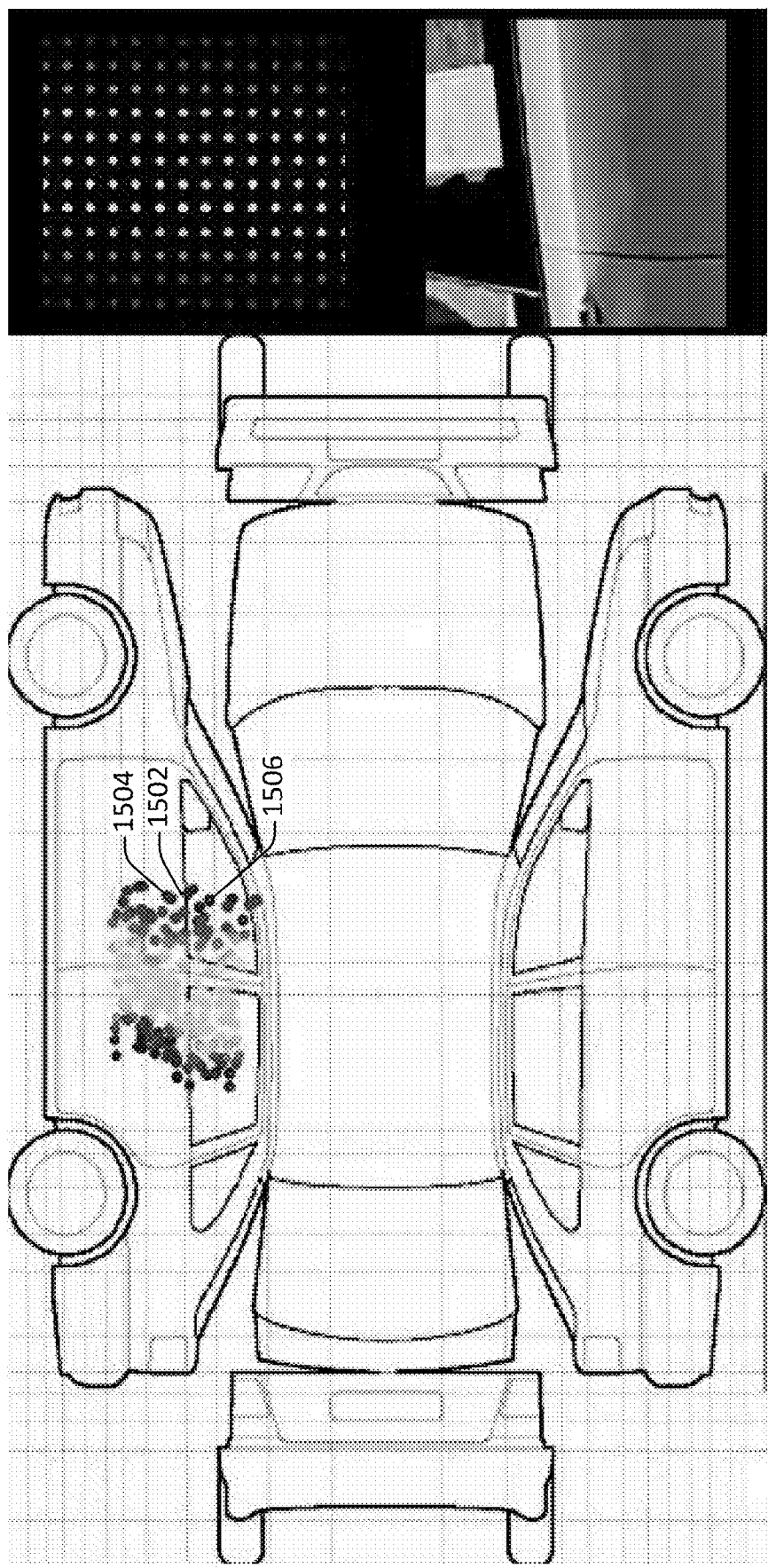

Examples of an image to top-down mapping are shown in FIGS. 13, 14, and 15. The locations of pixels in images of vehicle components are represented by colored dots. These dot locations are mapped from fixed locations 1302 in the perspective view to corresponding locations 1304 on the top-down view 1306. FIG. 14 shows a similar arrangement, with fixed locations 1402 in the perspective view mapped to corresponding locations 1404 in the top-down view 1406. For example, in FIG. 13, the color coding corresponds to the location of the points in the image. A similar procedure may be performed in reverse to map from the top-down view to the perspective view.

In some implementations, a point of interest may be mapped as a weighted average of nearby points. For example, in FIG. 15, the mapping of any particular point, such as 1502, may depend on the value of nearby points, such as 1504 and 1506, drawn from the mapped location in perspective view.

Returning to FIG. 18, as an alternative to operations 1806-1810, the projections of the 3D skeleton joints faces may be used together with the corresponding joints and faces in the top-down view to directly define image transformations that map pixel information from the perspective views into the top-down view and vice versa.

A determination is made at 1816 as to whether to select an additional pixel for analysis. According to various embodiments, analysis may continue until all pixels or a suitable number of pixels are mapped. As discussed with respect to operation 1806, pixels may be analyzed in sequence, in parallel, or in any suitable order.

Optionally, the computed pixel values are aggregated at 1818. According to various embodiments, aggregating the computing pixel values may involve, for example, storing a cohesive pixel map on a storage device or memory module.

According to various embodiments, one or more of the operations shown in FIG. 18 may be omitted. For example, a pixel may be ignored rather than setting it as a background pixel at 1812. In some implementations, one or more of the operations may be performed in an order different from that shown in FIG. 18. For example, pixel values may be aggregated cumulatively during pixel analysis. As another example, pixel values may be determined in parallel.

Figure 19:
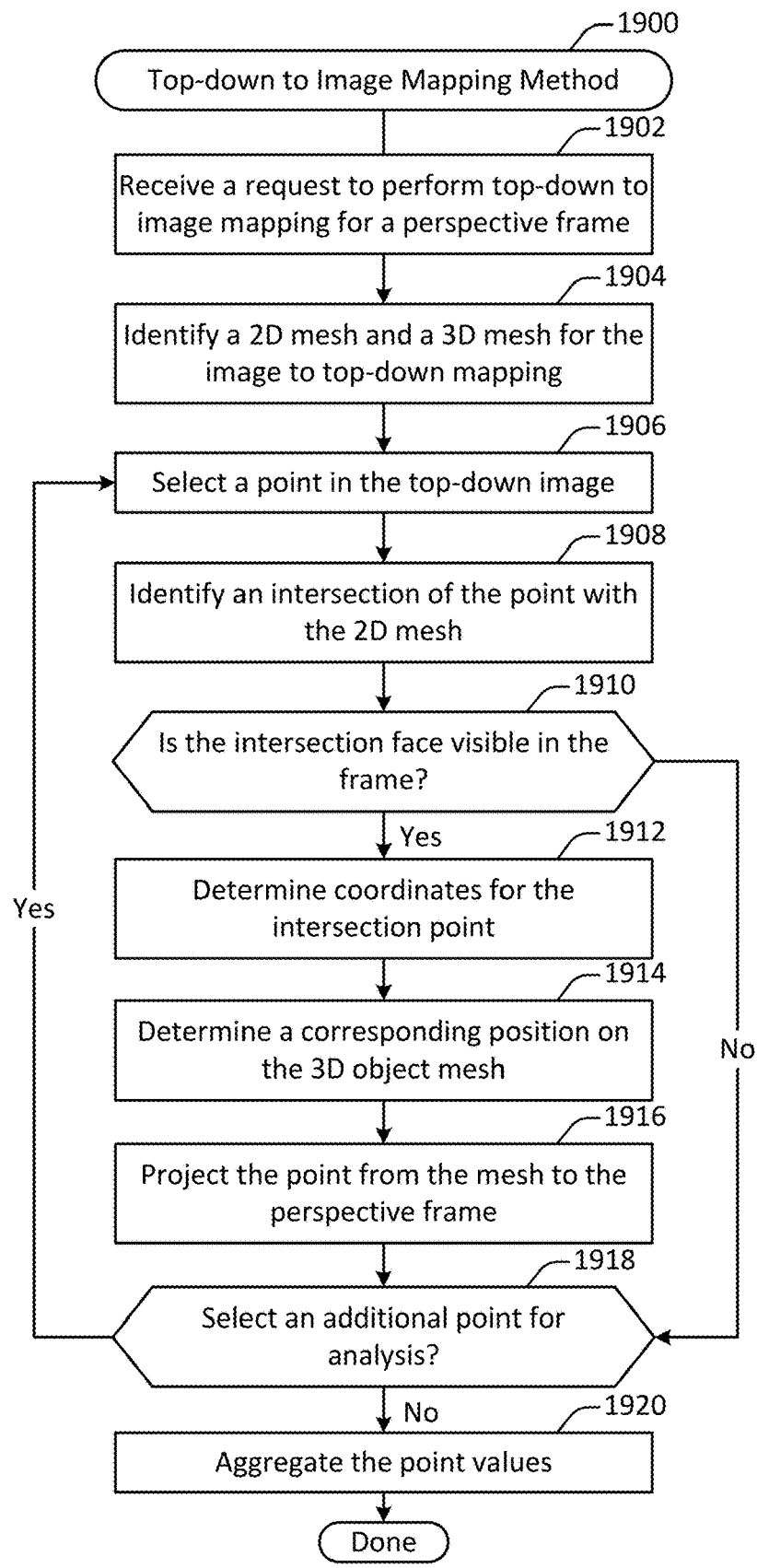
FIG. 19 illustrates one example of a method for performing top-down view to perspective image mapping, performed in accordance with one or more embodiments.

FIG. 19 illustrates one example of a method 1900 for performing top-down view to perspective image mapping, performed in accordance with one or more embodiments. According to various embodiments, top-down to image mapping refers to finding in a perspective image the position points from a top-down image.

The method 1900 may be performed on any suitable computing device. For example, the method 1900 may be performed on a mobile computing device such as a smart phone. Alternately, or additionally, the method 1900 may be performed on a remote server in communication with a mobile computing device.

At 1902, a request to perform top-down to image mapping is received for a perspective frame. The request to perform top-down to image mapping may be generated after the completion of a geometric analysis method such as the method 1700 shown in FIG. 17. For example, the request may be generated as discussed with respect to the operation 106 shown in FIG. 1.

At 1904, a 2D mesh and 3D mesh are identified. for the perspective image to top-down mapping. In some embodiments, a 2D mesh and 3D mesh may be constructed as discussed with respect to the method 1700 shown in FIG. 17. A 3D mesh is also referred to herein as a 3D skeleton.

At 1906, a point in the top-down image is selected for analysis. According to various embodiments, points may be selected in any suitable order. For example, points may be selected sequentially. As another example, points may be selected based on characteristics such as location. For example, points may be selected within a designated face before moving on to the next face of the top-down image.

At 1908, an intersection of the point with the 2D mesh is identified. A determination is then made at 1910 as to whether the intersection face is visible in the frame. According to various embodiments, the determination may be made in part by checking one or more visibility ranges determined in the preliminary step for the vertices of the intersection face. If the intersection face is not visible, then the point may be discarded.

If the intersection face is visible, then at 1912 coordinates for the intersection point are determined. According to various embodiments, determining coordinate points may involve, for example, extracting barycentric coordinates for the point with respect to the vertices of the intersection face.

A corresponding position on the 3D object mesh is determined at 1914. According to various embodiments, the position may be determined by applying the barycentric coordinates as weights for the vertices of the corresponding intersection face in the object 3D mesh.

The point is projected from the mesh to the perspective frame at 1916. In some implementations, projecting the point may involve evaluating the camera pose and/or the object 3D mesh for the frame. For example, the camera pose may be used to determine an angle and/or position of the camera to facilitate the point projection.

Figure 10:
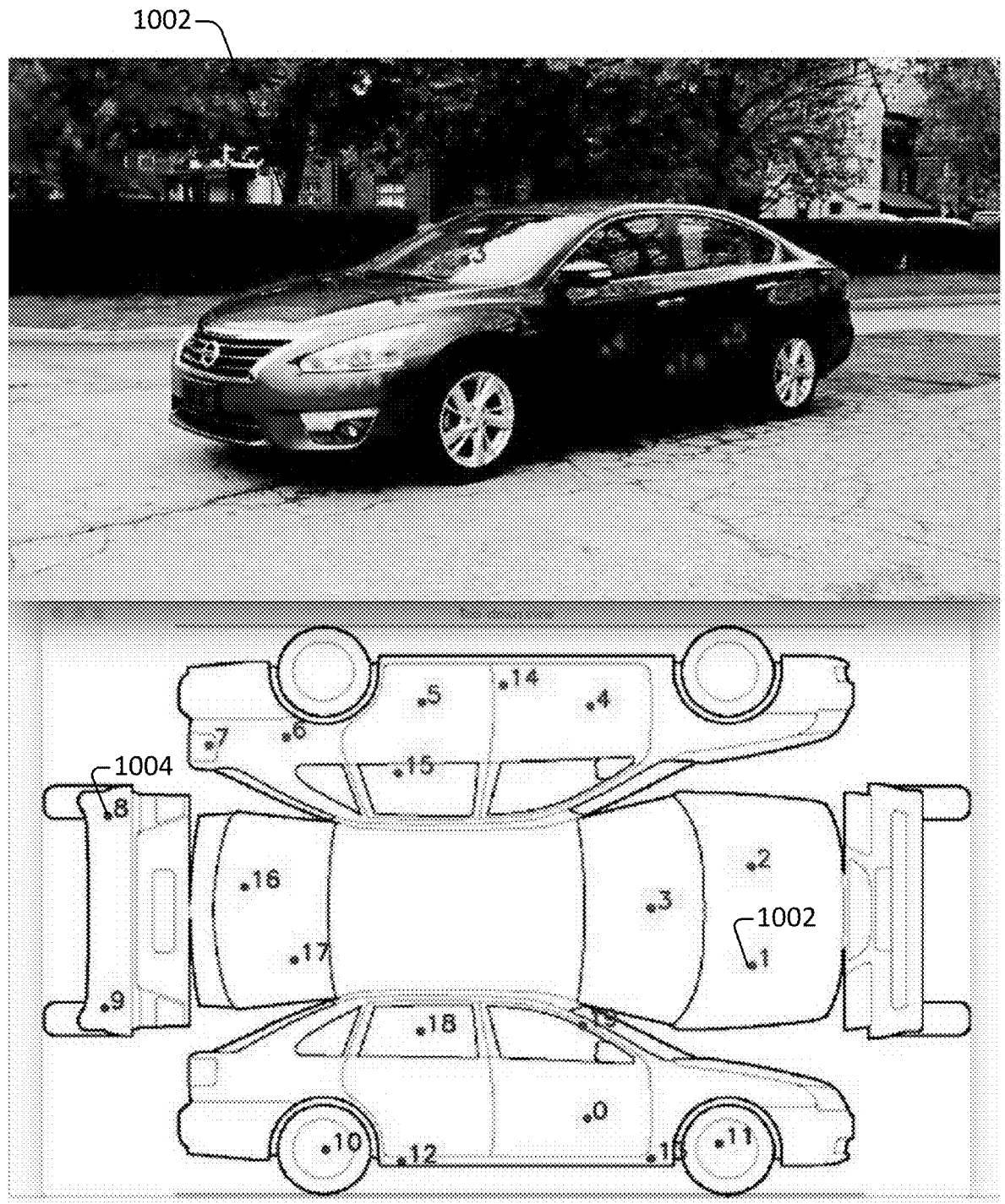

FIG. 10 illustrates an example of the mapping of 20 points from the top-down image of a vehicle to a perspective frame. In FIG. 10, points in red such as point 1 1002 are identified as visible in the perspective frame and are thus correctly mapped, while points in blue such as point 8 1004 are not mapped since they are not visible in the perspective view.

Figure 11:
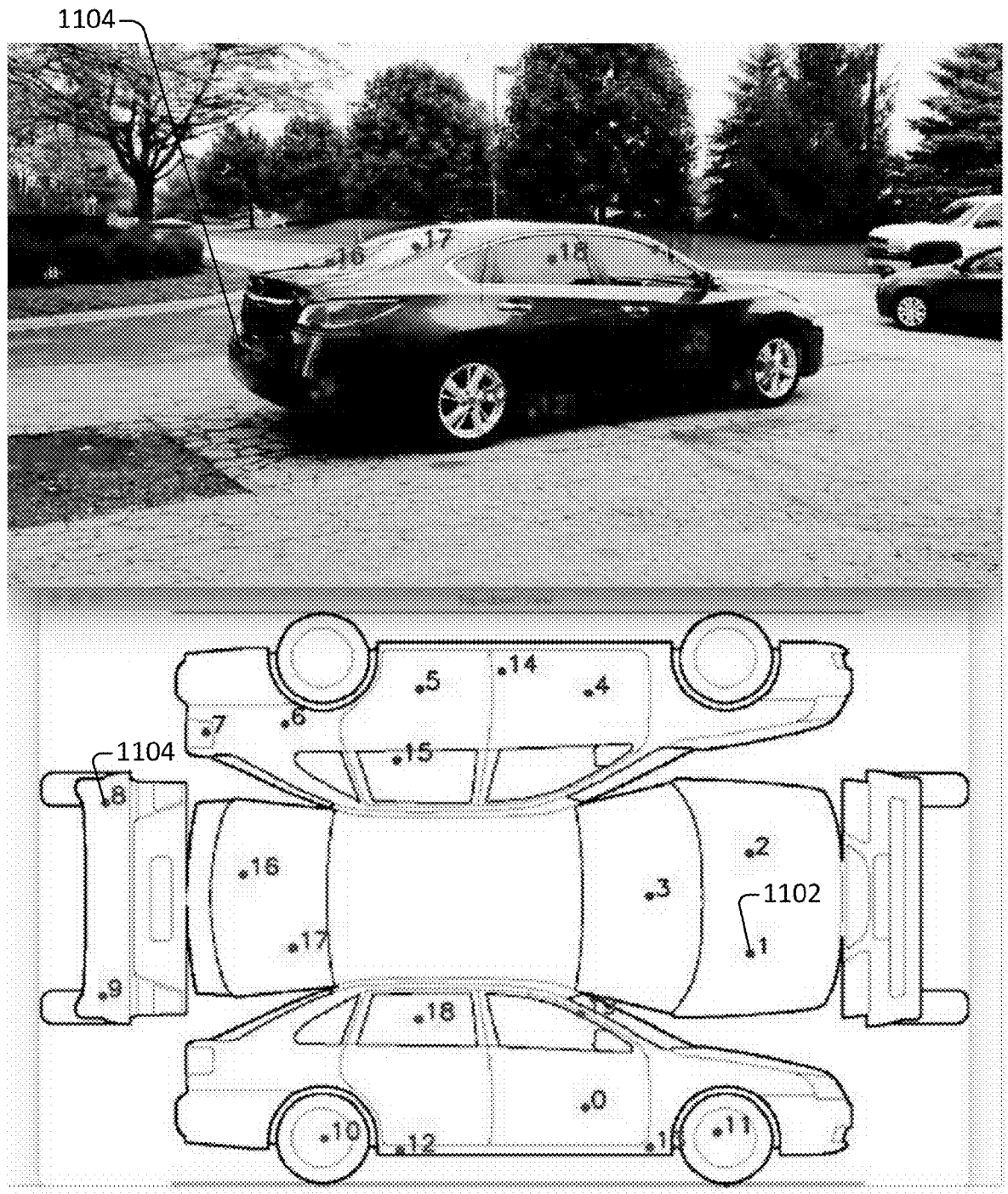

FIG. 11 illustrates an example of the mapping of the same 20 points from the same top-down image of the vehicle to a different perspective frame. In FIG. 11, joints that were not visible in FIG. 10 are now visible and thus are correctly mapped. For example, points in red such as point 8 1004 are identified as visible in the perspective frame and are thus correctly mapped, while points in blue such as point 1 1002 are not mapped since they are not visible in the perspective view.

According to various embodiments, if the top-down image contains information identifying which object part a pixel belongs to, then top-down mapping may forward such information to the object perspective frames. Alternately, or additionally, before running the machine learning algorithm to directly determine a mapping between image and top-down view, the system may first run a network to separate and/or segment all of the object parts.

Figure 12:
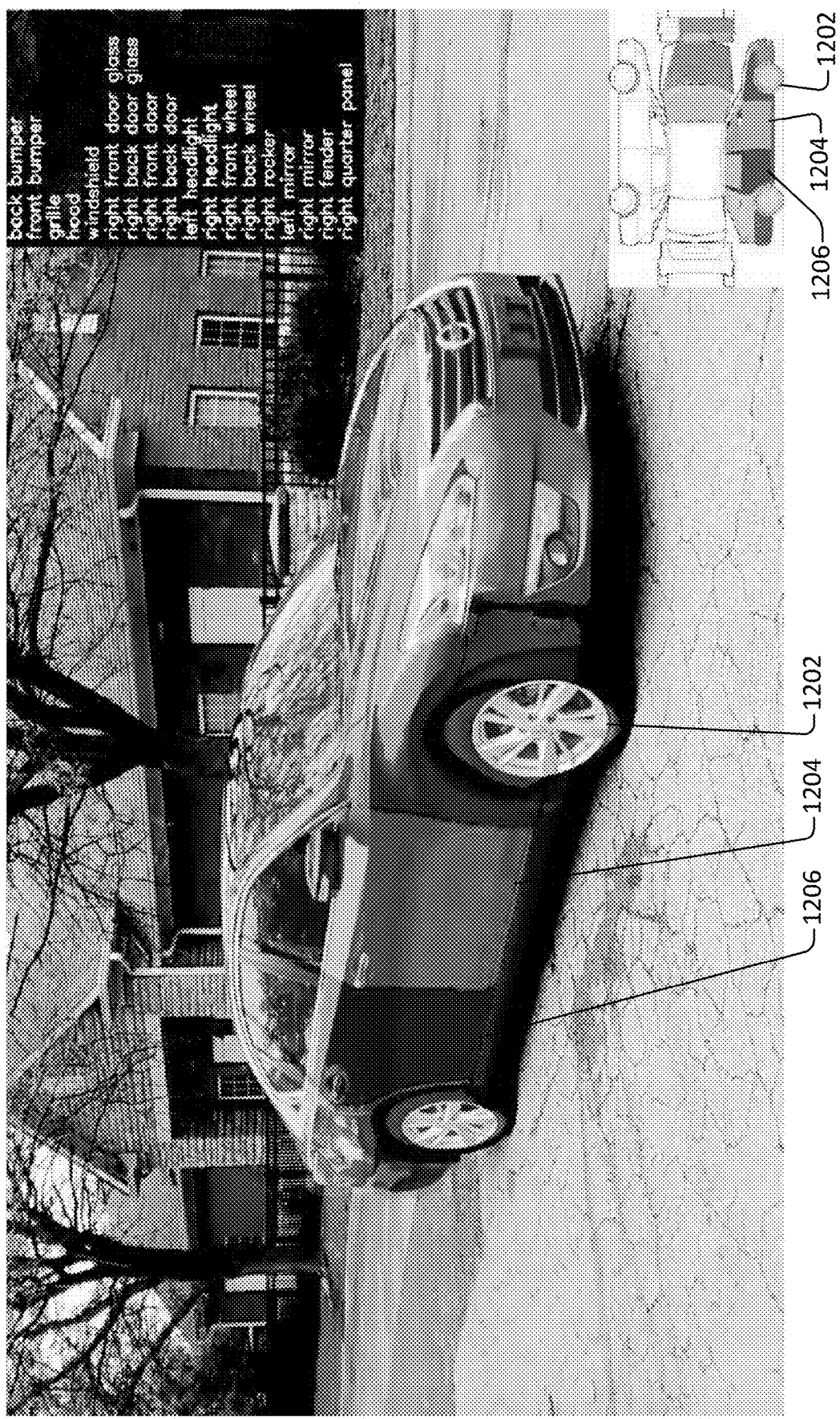

According to various embodiments, object component identity information may be used to allow separate mapping estimation for different object components. For example, the image of the vehicle shown in FIG. 12 has been segmented to identify the different vehicle components, which are shown in different colors. For example, the vehicle includes the components 1202, 1204, and 1206 which correspond with the front right wheel, the front right door, and the rear right door respectively. These components have then been separately supplied as input to the machine learning algorithm for the mapping estimation, as shown in the bottom right of the image.

In some implementations, different object sub-types may be associated with different top-down views. For example, sedans and trucks may be associated with different top-down views. In such configurations, the appropriate top-down view may then be determined based on the object sub-type. The object sub-type may be determined in any of various ways, such as user input, machine learning, or analysis of the 3D skeleton.

Returning to FIG. 19, as an alternative to operation 1916, the projections of the 3D skeleton joints faces may be used together with the corresponding joints and faces in the top-down view to directly define image transformations that map pixel information from the perspective views into the top-down view and vice versa.

A determination is made at 1918 as to whether to select an additional point for analysis. According to various embodiments, analysis may continue until all point within a top-down image or a suitable number of points are mapped.

Optionally, the computed point values are aggregated at 1920. According to various embodiments, aggregating the computing point values may involve, for example, storing a cohesive point map on a storage device or memory module.

Although particular features have been described as part of each example in the present disclosure, any combination of these features or additions of other features are intended to be included within the scope of this disclosure. Accordingly, the embodiments described herein are to be considered as illustrative and not restrictive. Furthermore, although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention.

The invention claimed is:

1. A computing device comprising:
a camera configured to capture a live camera feed of an object;
a processor configured to:
determine an object identity for an object represented the live camera feed during an initialization phase, the initialization phase including projecting one or more triangulated points into a designated frame based on camera pose information determined based on data collected from an inertial measurement unit at the computing device, wherein projecting the one or more triangulated points includes triangulating 2D skeleton joints into 3D skeleton joints,
create an object model of the object by performing skeleton detection on the live camera feed;
determine augmented reality overlay data based on the object identity, the augmented reality overlay data including one or more tags, each of the tags characterizing a feature of the object, each of the tags being associated with a respective location on the object, each of the respective locations being represented in a reference view of the object, wherein a temporal filter is applied to the overlay data locations by weighting or averaging displayed overlay data locations for a current frame based on overlay data locations determined in previous frames, wherein the temporal filter is used to generate a smooth visualization of a result, and
determine, for each of a plurality of frames in the live camera feed, a respective frame location for one or more of the tags, each of the respective frame locations determined based on a correspondence between the reference view of the object and the respective frame; and
a display screen configured to present the live camera feed including the plurality of frames during a presentation phase after the initialization phase, each of the plurality of frames including a respective one of the tags, each of the tags being positioned at the respective frame location, wherein the initialization phase is performed again when the computing device determines that the live camera feed has changed more than a designated amount from the image present when initialization was last performed, wherein initialization comprises estimating a reference-to-live image correspondence using a surface mesh.

2. The computing device recited in claim 1, the method further comprising:
for each of the frames, determining the correspondence between the reference view of the object and the respective frame.

3. The computing device recited in claim 1, wherein the presentation phase involves triangulating a three-dimensional representation of the object for each of the frames, wherein the three-dimensional representation is triangulated based on the correspondence between the reference view and the respective frame.

4. The computing device recited in claim 1, wherein the reference view of the object is a multi-view interactive digital media representation, the multi-view interactive digital media representation including a plurality of images of the object, each of the images of the object being captured from a different perspective view.

5. The computing device recited in claim 4, wherein the multi-view interactive digital media representation is navigable in one or more dimensions, the method further comprising:
generating the multi-view interactive digital media representation via the processor.

6. One or more non-transitory computer readable media having instructions stored thereon for performing a method, the method further comprising:
presenting on a display screen at a computing device a live camera feed captured at a camera at the computing device during an initialization phase;
determining via a processor at a computing device an object identity for an object represented in a live camera feed during the initialization phase, the initialization phase including projecting one or more triangulated points into a designated frame based on camera pose information determined based on data collected from an inertial measurement unit at the computing device, wherein projecting the one or more triangulated points includes triangulating 2D skeleton joints into 3D skeleton joints;

creating an object model of the object by performing skeleton detection on the live camera feed;

determining via the processor augmented reality overlay data based on the object identity, the augmented reality overlay data include one or more tags, each of the tags characterizing a feature of the object, each of the tags being associated with a respective location on the object, each of the respective locations being represented in a reference view of the object, wherein a temporal filter is applied to the overlay data locations by weighting or averaging displayed overlay data locations for a current frame based on overlay data locations determined in previous frames, wherein the temporal filter is used to generate a smooth visualization of a result;

determining, for each of a plurality of frames in the live camera feed, a respective frame location for one or more of the tags, each of the respective frame locations determined based on a correspondence between the reference view of the object and the respective frame; and presenting the live camera feed on a display screen during a presentation phase after the initialization phase, the live camera feed including the plurality of frames, each of the plurality of frames including a respective one of the tags, each of the tags being positioned at the respective frame location, wherein the initialization phase is performed again when the computing device determines that the live camera feed has changed more than a designated amount from the image present when initialization was last performed, wherein initialization comprises estimating a reference-to-live image correspondence using a surface mesh.

* * * * *